| (12) | United States Patent<br>Cooper et al. | (10) Patent No.: US 10,647,590 B2<br>(45) Date of Patent: May 12, 2020 |
|---|---|---|

(54) REMOVABLE AND RETROFITTABLE WATER DISPENSER FOR A REFRIGERATOR

(71) Applicant: WHIRLPOOL CORPORATION, Benton Harbor, MI (US)

(72) Inventors: David P. Cooper, Dowagiac, MI (US); Christopher A. Gregory, St. Joseph, MI (US); James C. Guarino, Kalamazoo, MI (US); Beth M. Jackson, St. Joseph, MI (US); Steven J. Kuehl, Stevensville, MI (US); Joseph R. Peters, St. Joseph, MI (US); Siew Siew Chun, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 328 days.

(21) Appl. No.: 15/849,958

(22) Filed: Dec. 21, 2017

(65) Prior Publication Data

US 2018/0179083 A1 Jun. 28, 2018

Related U.S. Application Data

(60) Provisional application No. 62/438,320, filed on Dec. 22, 2016.

(51) Int. Cl.
 *C02F 1/00* (2006.01)
 *F25D 23/02* (2006.01)
 *F25D 23/12* (2006.01)

(52) U.S. Cl.
 CPC ............ *C02F 1/003* (2013.01); *F25D 23/028* (2013.01); *F25D 23/126* (2013.01); *C02F 2201/006* (2013.01); *C02F 2307/10* (2013.01); *C02F 2307/12* (2013.01); *F25D 2323/121* (2013.01)

(58) Field of Classification Search
 CPC .................................................... C02F 1/003; C02F 2201/006; C02F 2307/10; C02F 2307/12; F25D 2323/121; F25D 23/028; F25D 23/126
 See application file for complete search history.

(56) References Cited

U.S. PATENT DOCUMENTS

| 490,022 | A | 1/1893 | Horn |
| 7,261,815 | B2 | 8/2007 | Cur et al. |
| 8,282,820 | B2 | 10/2012 | Cur et al. |
| 8,303,813 | B2 | 11/2012 | Coleman |
| 8,496,823 | B2 | 7/2013 | Cur et al. |
| 8,627,675 | B2 | 1/2014 | Kruckenberg et al. |
| 9,297,573 | B2 | 3/2016 | Krause et al. |

(Continued)

FOREIGN PATENT DOCUMENTS

JP 11138151 A 5/1999

*Primary Examiner* — Dirk R Bass
(74) *Attorney, Agent, or Firm* — Nyemaster Goode, P.C.

(57) ABSTRACT

A removable water dispenser for an appliance having a manifold with a first water connected to a household water supply, a first water outlet connected to the first water inlet, a second water inlet, and a second water outlet connected to the second water inlet. The removable water dispenser also has a dispenser removably attached to a home appliance and having a housing, a cover coupled with the housing, a dispensing outlet, and a filter connected to the first outlet, the second inlet, and the dispensing outlet, and the dispenser dispenses filtered water to a user.

20 Claims, 30 Drawing Sheets

(56) References Cited

U.S. PATENT DOCUMENTS

| | | |
|---|---|---|
| 9,320,993 B2 | 4/2016 | Patera et al. |
| 2007/0012611 A1 | 1/2007 | An |
| 2008/0110198 A1* | 5/2008 | Egan ................ F25D 23/02 62/389 |
| 2012/0210740 A1 | 8/2012 | Kim |
| 2014/0131290 A1 | 5/2014 | Patera et al. |

* cited by examiner

REMOVABLE AND RETROFITTABLE WATER DISPENSER FOR A REFRIGERATOR

CROSS-REFERENCE TO RELATED APPLICATION

This application claims priority to U.S. Provisional Patent Application Ser. No. 62/438,320, filed Dec. 22, 2016, entitled "REMOVABLE AND RETROFITTABLE WATER DISPENSER FOR A REFRIGERATOR", the disclosure of which is hereby incorporated by reference in its entirety.

BACKGROUND

Many refrigerators sold today include water dispensers within a door of the refrigerator. Some have a dispenser within the cabinet of the refrigerator. For various reasons, some consumers may purchase a refrigerator or other appliance without a water dispenser included, but later may desire to have filtered water available on-demand at a convenient location.

SUMMARY

One aspect of the present disclosure includes a removable water dispenser for an appliance having a manifold with a first water connected to a household water supply, a first water outlet connected to the first water inlet, a second water inlet, and a second water outlet connected to the second water inlet. The removable water dispenser also has a dispenser removably attached to a home appliance and having a housing, a cover coupled with the housing, a dispensing outlet, and a filter connected to the first outlet, the second inlet, and the dispensing outlet, and the dispenser dispenses filtered water to a user.

Another aspect of the present disclosure includes a water dispenser removably attached to a refrigerator, having a manifold with a first and second water inlet and a first and second water outlet, a dispenser removably attached to a face of a home appliance, the dispenser having a housing, a cover coupled with the housing, a dispensing outlet, and a filter connected to the first outlet, the second inlet, and the dispensing outlet. The water dispenser has a first water line connected with the first water inlet and a household water supply, a second water line in connection with the first water outlet and the filter, a third water line in connection with the water filter and the second water inlet, and a fourth water line in connection with the second water outlet and an ice maker of a home appliance.

Yet another aspect of the present disclosure includes an external water dispenser having a retrofittable water dispenser assembly configured to removably attach to a refrigerator, the water dispenser having a housing with a substantially rectangular enclosure bounded on a back side by a backplate, and on a top, bottom, right side and left side by a fascia cover, the backplate having a keyhole slot. The water dispenser also has a water filter and a water dispenser connected to the water filter, the water dispenser being accessible to a user without opening a door of the refrigerator, first and second water lines fluidly connected from a household water source to the filter, a filter manifold within the housing to direct water from the first water line through the filter and out to the dispenser and through the second water line, and a removable base attached to a surface of the refrigerator and having a tab configured to fit within the keyhole slot and hold the backplate in place.

These and other aspects, objects, and features of the present invention will be understood and appreciated by those skilled in the art upon studying the following specification, claims, and appended drawings.

DETAILED DESCRIPTION

Figure 1:
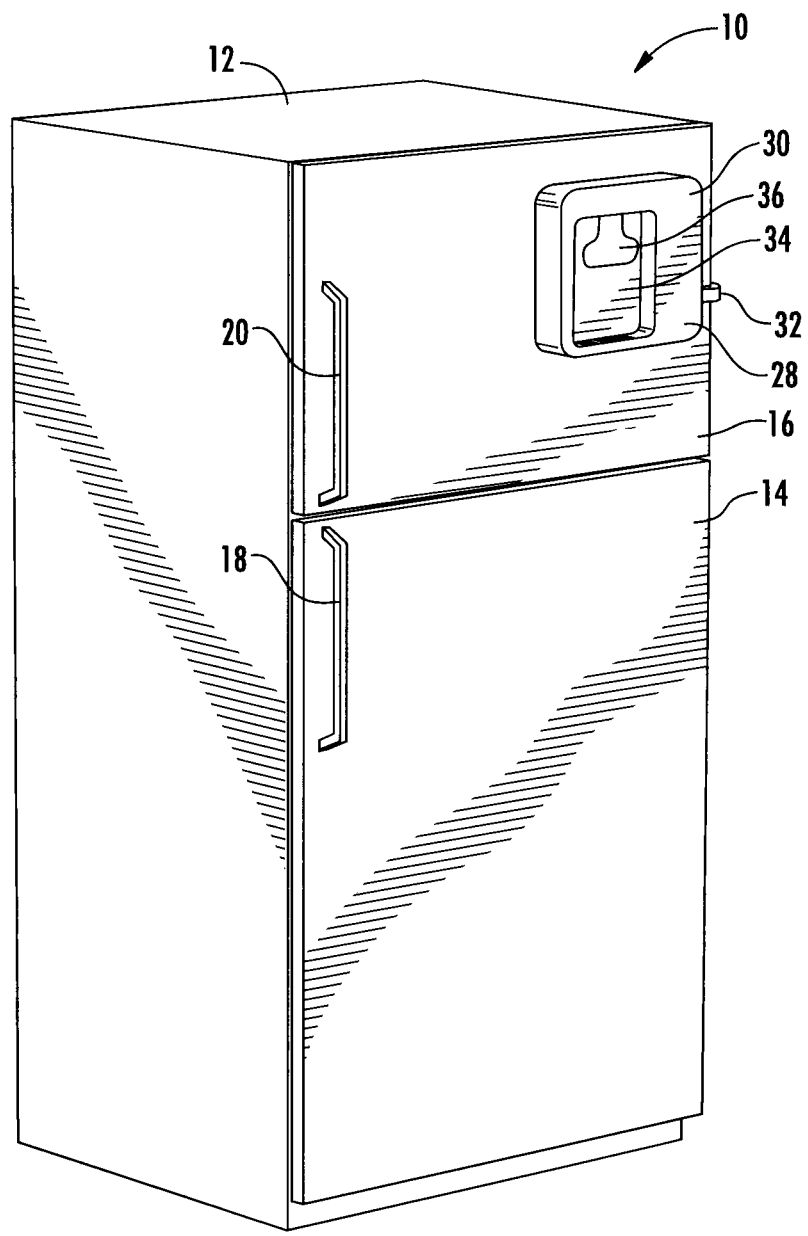
FIG. 1 is a perspective view of a removable water dispenser according to an aspect of the present disclosure engaged with the front surface of an appliance.

For purposes of description herein, the terms "upper," "lower," "right," "left," "rear," "front," "vertical," "horizontal," and derivatives thereof shall relate to the orientation in FIG. 1. However, it is to be understood that the various aspects of the present disclosure and the claimed invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 44:
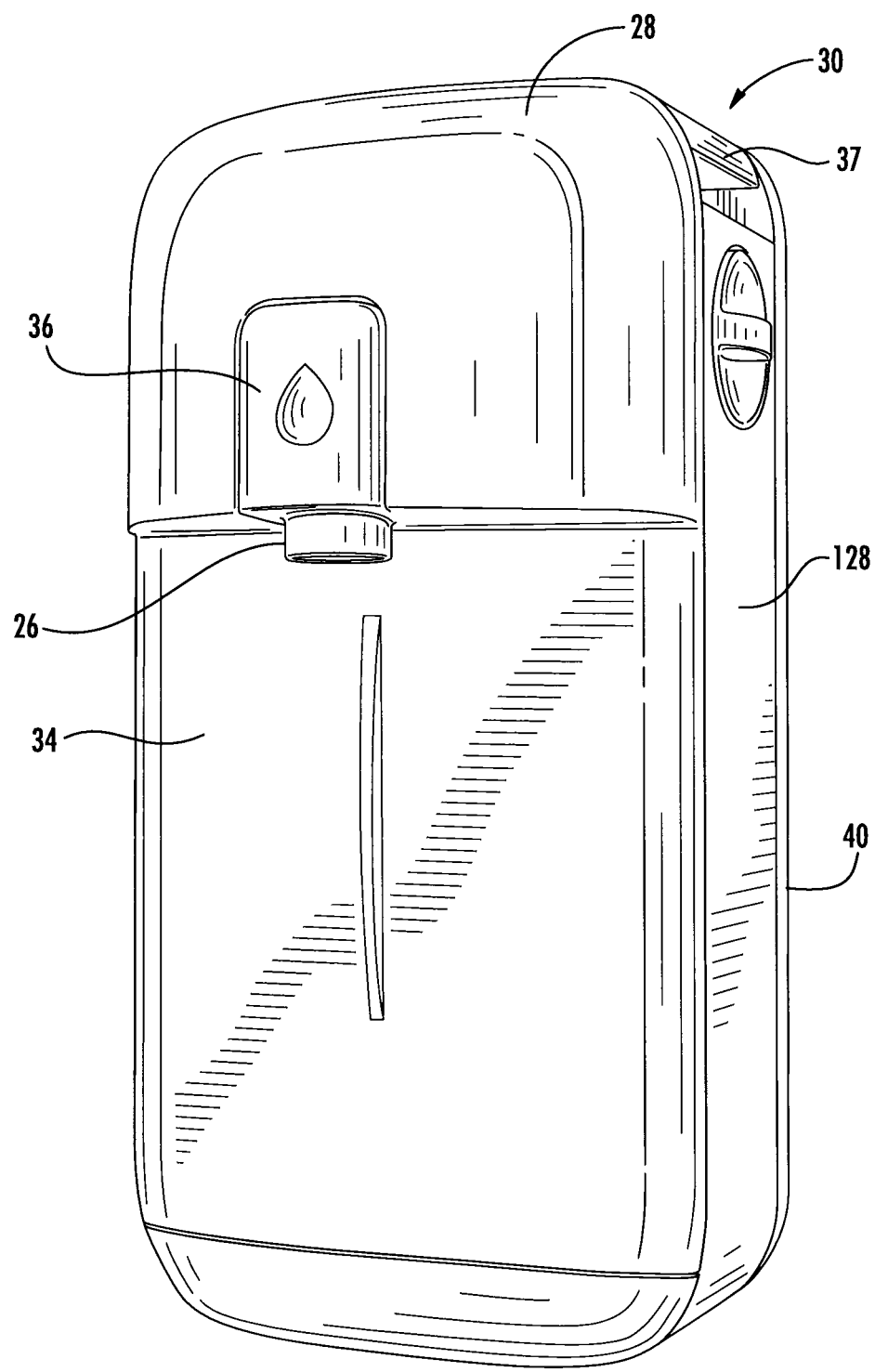
FIG. 44 shows an overall perspective view a removable water dispenser housing and system according to an aspect of the present disclosure.
Figure 45:
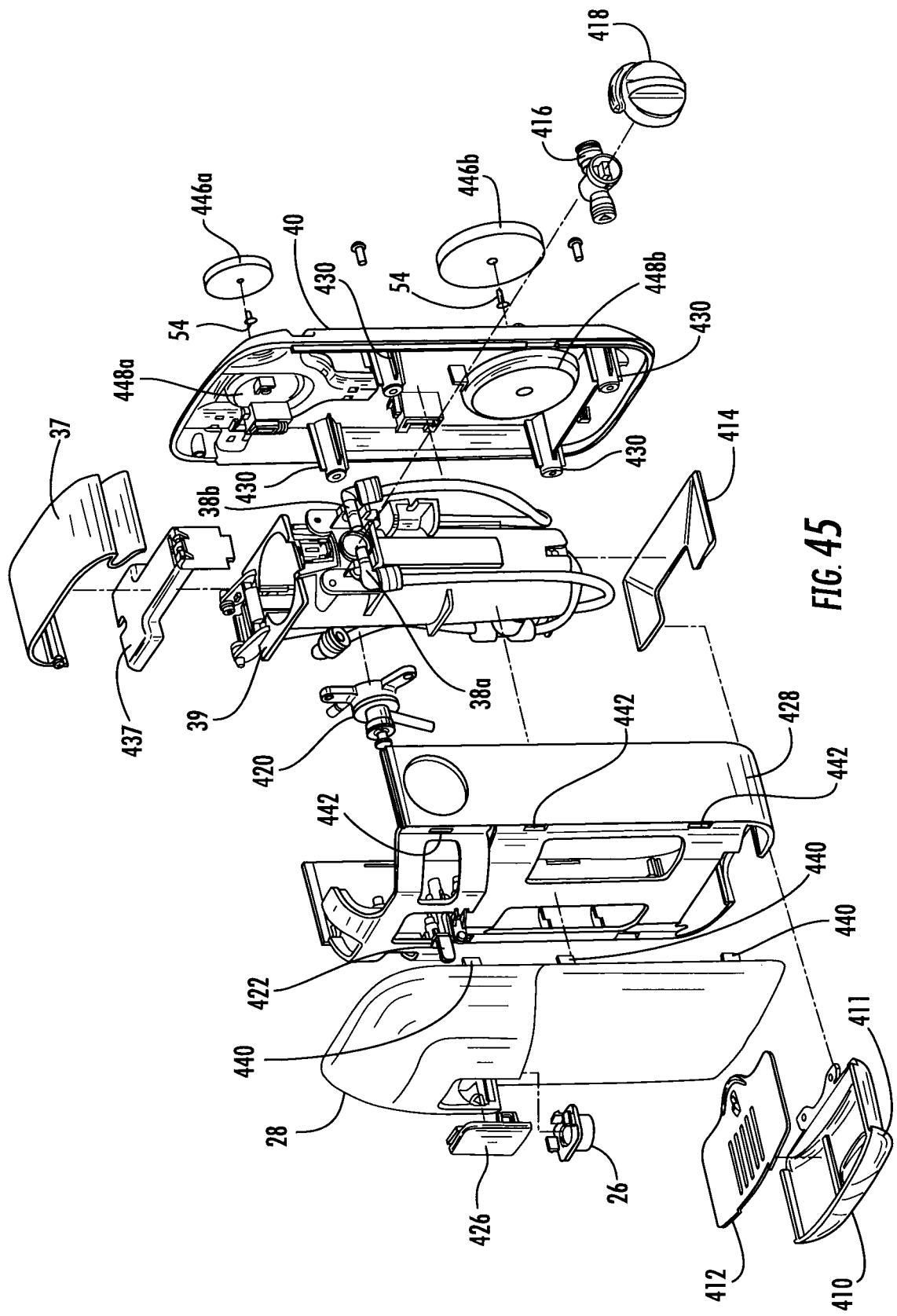
FIG. 45 shows an upper left exploded perspective view of the removable water dispenser shown in FIG. 44.
Figure 46:
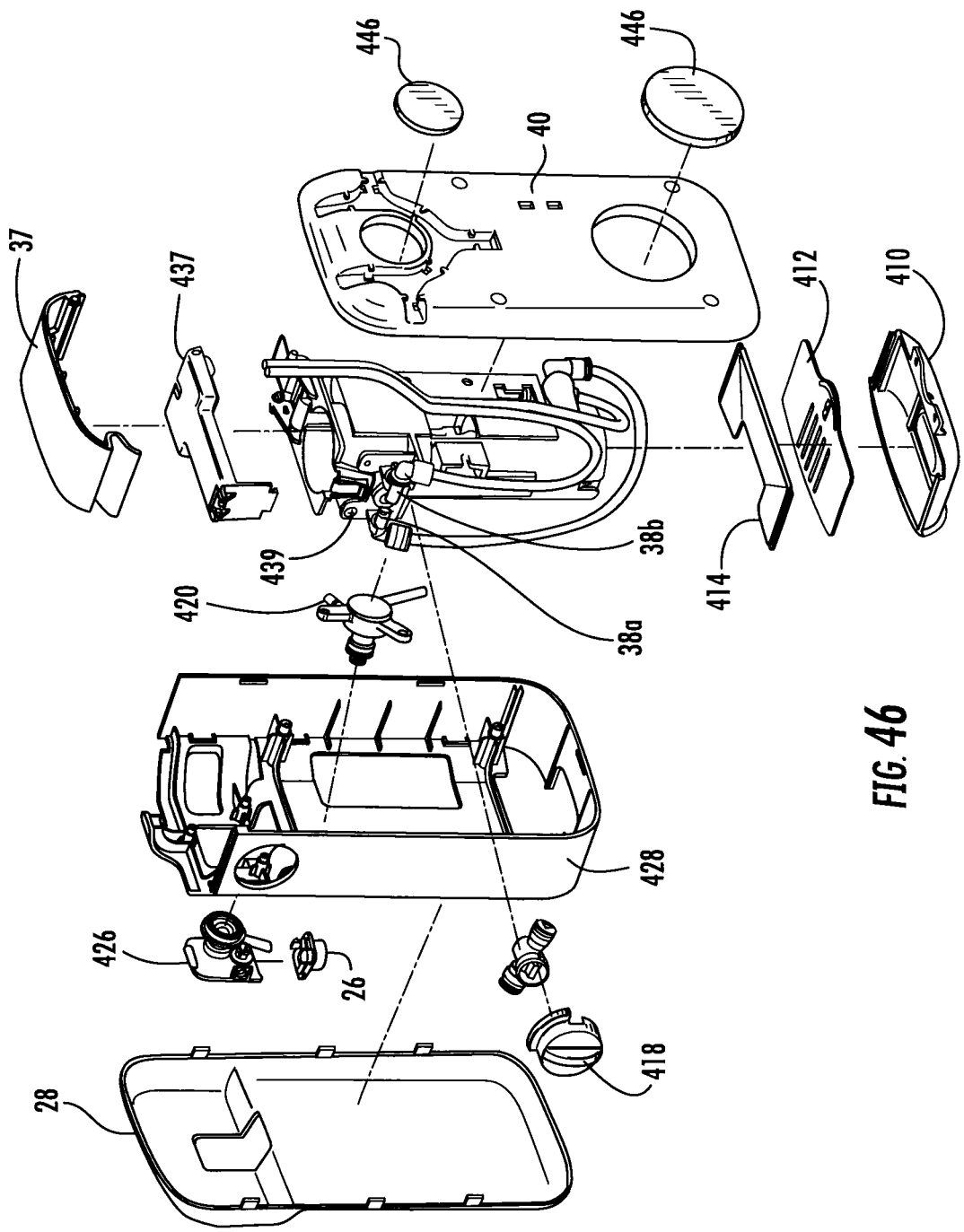
FIG. 46 shows an upper right exploded perspective view of the removable water dispenser shown in FIG. 44.

FIG. 1 shows a removable water dispenser 30 for a refrigerator 10 shown on an upper door 16 of the refrigerator 10. FIG. 1 shows a top mount refrigerator where the freezer compartment is located above the refrigerator compartment, but it should be known that the refrigerator can be any configuration such as a bottom mount, a French door bottom mount, or any other configuration of a refrigerator, or any other appliance near access to household water supply. The removable water dispenser 30 is attached to a door of the refrigerator 10, generally positioned on the front surface of the refrigerator and at a height where a person has easy access to the dispenser 30. The dispenser 30 may be attached to the door 16 in a location that is substantially opposite from a door handle 20. The dispenser 30 is typically attached such that it is engageable and disengageable from the surface of the appliance by hand and without the use of tools. The water dispenser 30 may generally include a front fascia 28, a dispensing area 34, and a dispensing paddle 36. The dispensing paddle or button 36 may be pushed by the vessel to be filled, similar to that shown in FIG. 1, or may be a finger operated button 36, as shown in FIGS. 44-46.

The dispenser 30 may also include one or more utility line 32, typically one utility line, such as a water line that has a water supply and water return line. The one or more utility lines may include one or more water lines, electrical lines, or any other utility that may be needed or desired at the water dispenser 30. The water dispenser 30 may also be attached to a lower door 14, which is a refrigerator compartment door in the configuration as shown, or a side upper door of a French-door configuration. The water dispenser may further be attached to a side wall of the refrigerator, by the same methods as detailed below.

Figure 2:
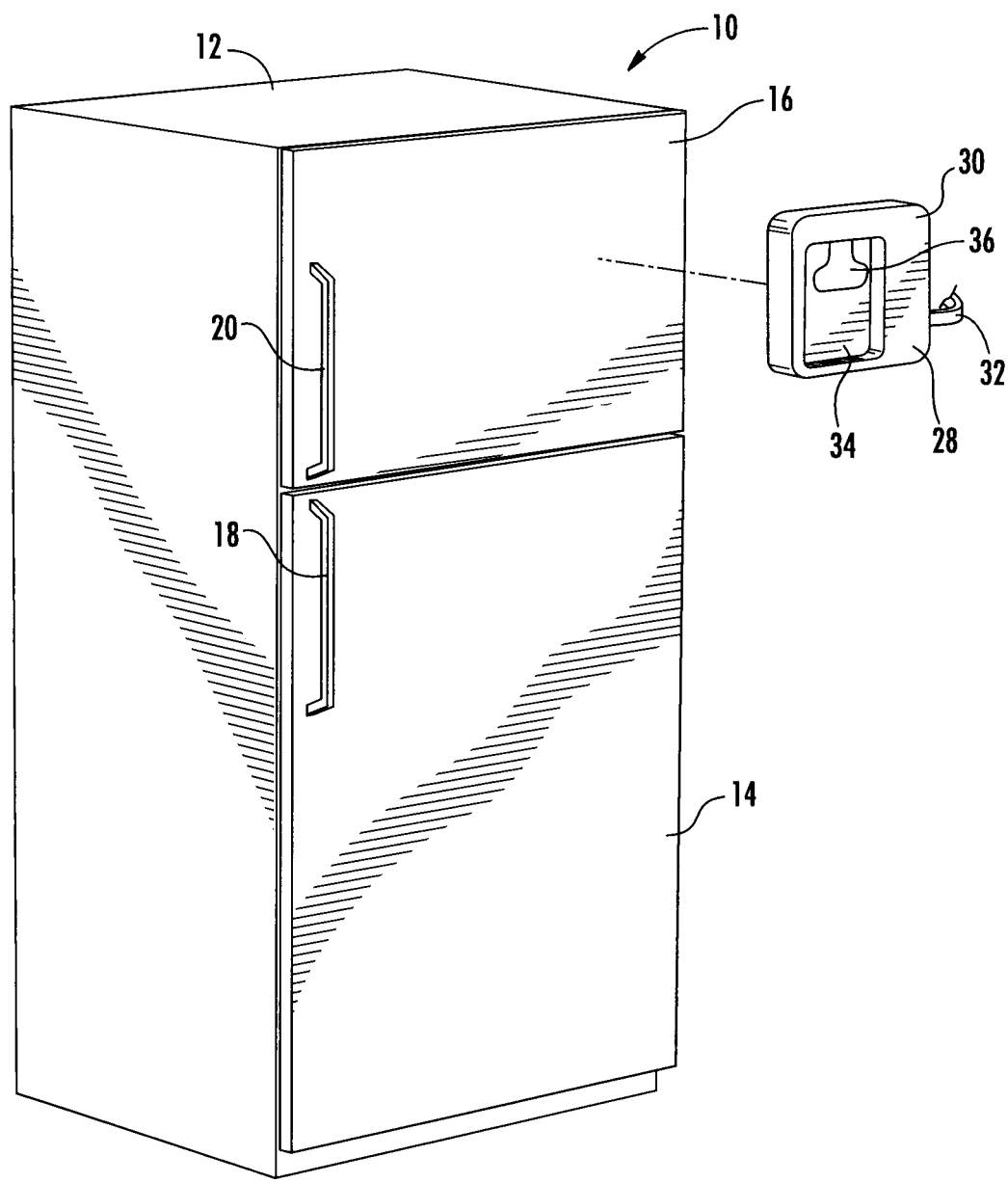
FIG. 2 is a perspective view of a removable water dispenser according to an aspect of the present disclosure removed from the front surface of an appliance.

FIG. 2 is another view of the refrigerator 10 with the removable water dispenser 30 shown removed from the refrigerator 10. The removable water dispenser is shown as a standalone module that may be removed and reattached from the refrigerator 10. Again, this is typically done by hand and without the use of tools, but may be done with the assistance of tools as well.

Figure 3:
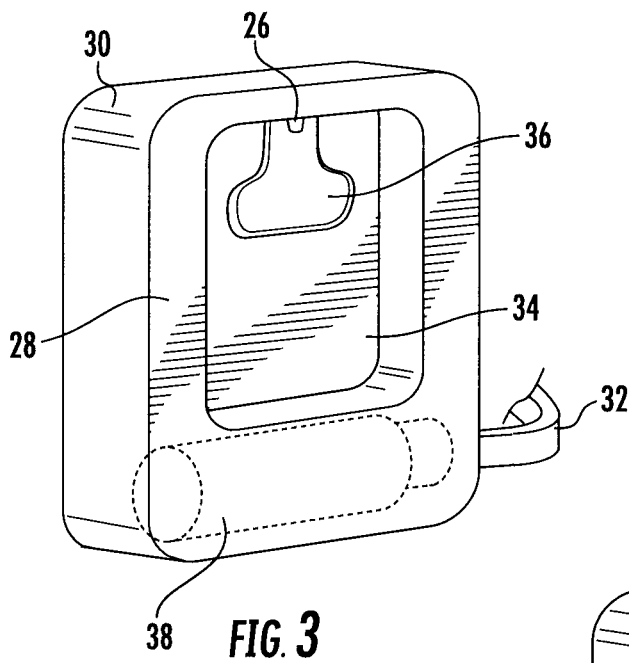
FIG. 3 is a perspective view of a removable water dispenser according to an aspect of the present disclosure incorporating a water filter in a at least substantially horizontal position within the housing of the water dispenser.
Figure 4:
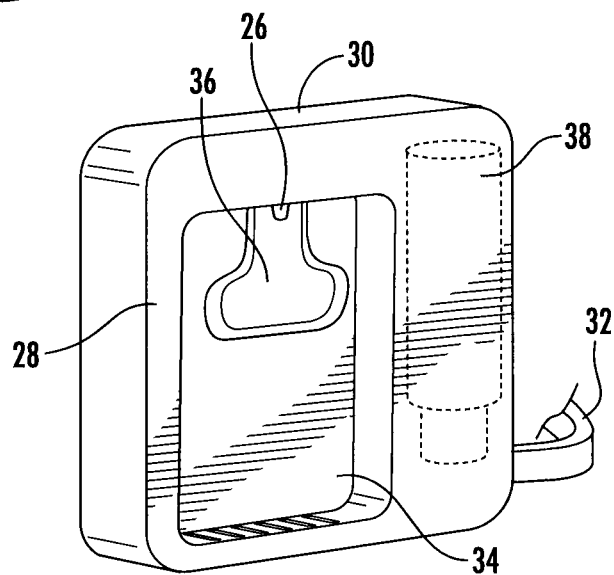
FIG. 4 is a perspective view of a removable water dispenser according to an aspect of the present disclosure incorporating a water filter in a at least substantially vertical position within the housing of the water dispenser.
Figure 5:
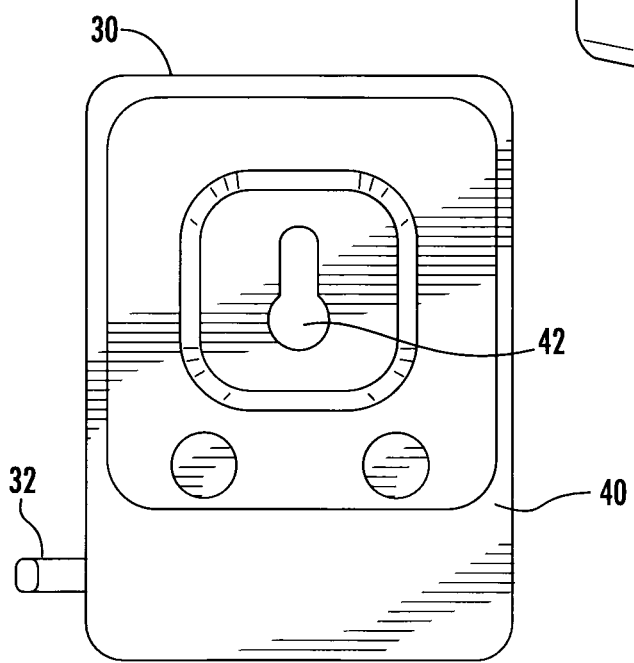
FIG. 5 is an elevated back view of a removable water dispenser according to an aspect of the present disclosure.

FIGS. 3, 4, and 5 show the removable water dispenser in more detail. FIG. 3 shows the water dispenser with a water filter 38 located in a bottom portion of the water dispenser. The water filter 38 may be hidden behind the front fascia 28 when the water dispenser is in its assembled state. As shown in FIG. 3, the filter is in an at least substantially horizontal position, and in FIG. 4 in an at least substantially vertical position; however, the filter could conceivably be oriented in any manner. The water filter 38 is connected to a source of household water through the conduit 32 and is connected to the water dispenser nozzle 26 through water lines underneath the fascia 28 within the removable water dispenser 30. The water may enter the water filter 38 through a water filter inlet 38a (FIG. 28), travel through the filter and the filtering media within the filter 38, exit the filter through a filter outlet 38b (FIG. 28), and back up to the nozzle 26. In this way, a user can have filtered water on-demand from a removable water dispenser 30 that is engaged to an appliance that may not have been manufactured with an indoor water dispenser, or otherwise would not have a water dispenser to dispense filtered water. FIG. 4 shows another embodiment with the water filter 38 disposed along a side of the removable water dispenser 30 and behind the front fascia 28.

FIG. 5 details a back side of a removable water dispenser 30 according to an aspect of the present disclosure. The water dispenser 30 may have a backplate 40 which rests against or is otherwise connected to the door 16. The backplate further includes a keyhole slot 42 that engages a hook or knob that fits therethrough. The backplate 40 may fit over the hook or knob in the circular portion of the slot 42, then slide down such that the hook or knob slides into the linear portion of the slot 42 and remains in place. The backplate 40 provides an easily attachable base to which the rest of the removable water dispenser may be attached.

The front fascia 28 may then be placed over the backplate 40, or the fascia 28 may be attached to the backplate 40 in any manner known in the art, such as, but not limited to, a clip connection, fasteners, an interference fit, or a slidable fit. The fascia 28 may be attached before attaching the module 30 to the refrigerator 10 or other appliance, or the backplate 40 may be attached first, and the fascia 28 then attached thereafter. A hook as used herein typically has a bent portion, but a hook does not necessarily need to have a bent portion and could be a straight extension similar to a rod or other generally cylindrically-shaped extension.

Figure 6A:
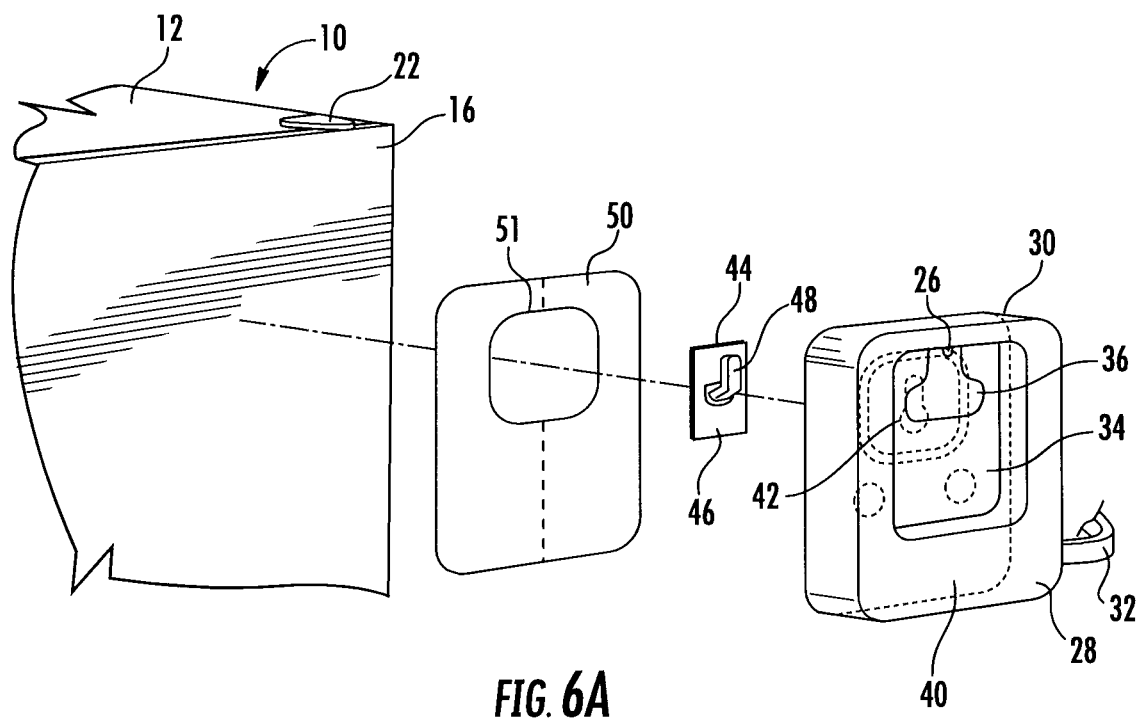
FIG. 6A is an exploded view of a removable water dispenser according to an aspect of the present disclosure.
Figure 6B:
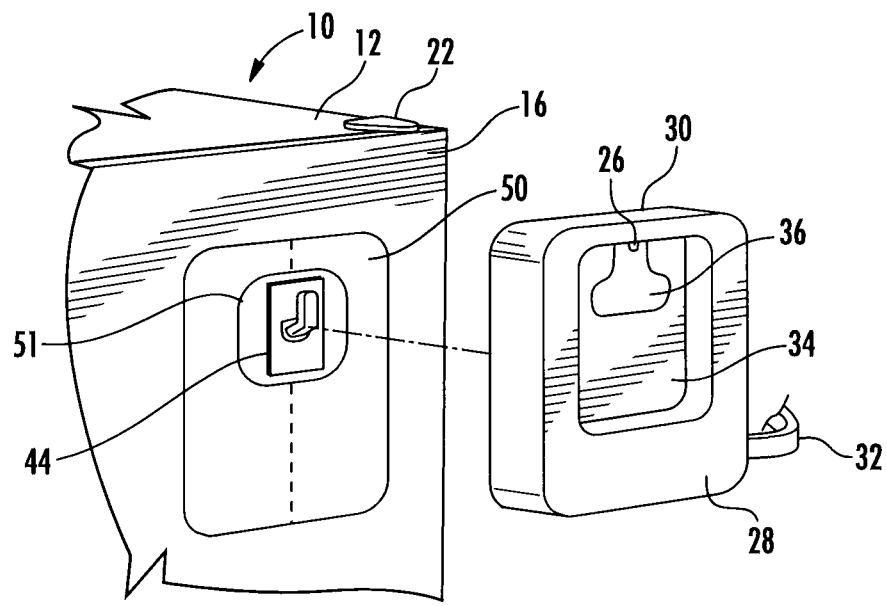
FIG. 6B is a partially exploded view of the removable water dispenser according to an aspect of the present disclosure with the attachment mechanism engaged to the refrigerator and the main water dispenser housing disengaged.

FIGS. 6A and 6B generally disclose one embodiment of an attachment method of the removable water dispenser to the refrigerator 10. A template 50 may be removably attached to the door 16, showing a user with a high degree of accuracy where the removable water dispenser 30 will be located when it is attached. The template 50 may be a paper template with adhesive on the back side so that it sticks on the refrigerator, but is removable therefrom if cleaned or otherwise removed. The template may be placed on the refrigerator in a place convenient for the user, and allows the user to locate the dispenser 30 in any location they may desire.

A hook assembly 44 may then be attached to the appliance surface through, and be spaced within, an aperture 51 of the template 50. The aperture 51 allows a user to place the hook assembly 44 in a place where the dispenser 30 will end up in the place desired by the user when fully assembled. The hook assembly 44 may be attached by an adhesive, not shown, or any other attachment method known in the art. The hook assembly has a base portion 46, which may include an adhesive to allow the hook assembly to attach to the refrigerator 10, and a hook portion 48, which may then fit into the keyhole slot 42 of the backplate 40 to allow the removable water dispenser 30 to be attached to the refrigerator 10. FIG. 6A shows an exploded view of all of these parts before they are attached to the refrigerator. FIG. 6B shows the template 50 and the hook assembly 44 attached to the refrigerator with the assembled water dispenser 30 as it is prepared to attach to the hook assembly 44.

Figure 7:
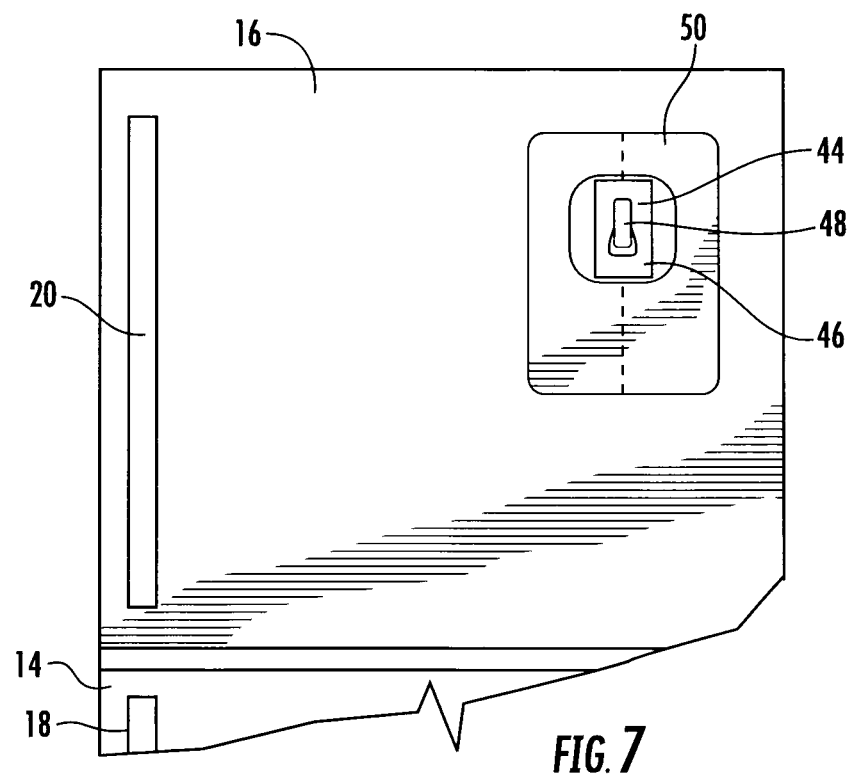
FIG. 7 is an elevated front view of the attachment location of the removable water dispenser according to an aspect of the present disclosure.

FIG. 7 shows a front elevation view of the template 50, the hook assembly 44, the hook base 46, and the hook 48 engaged with the front surface of the appliance's top door in a top mount refrigerator and freezer configuration. As discussed above, the template 50 and the hook assembly 44 are removably attached to the door 16 such that a user has an accurate estimation of where the removable water dispenser 30 will be when it is attached to the door 16, and can place the template 50 to locate the hook 44 in a place that is convenient for the user.

Figure 8:
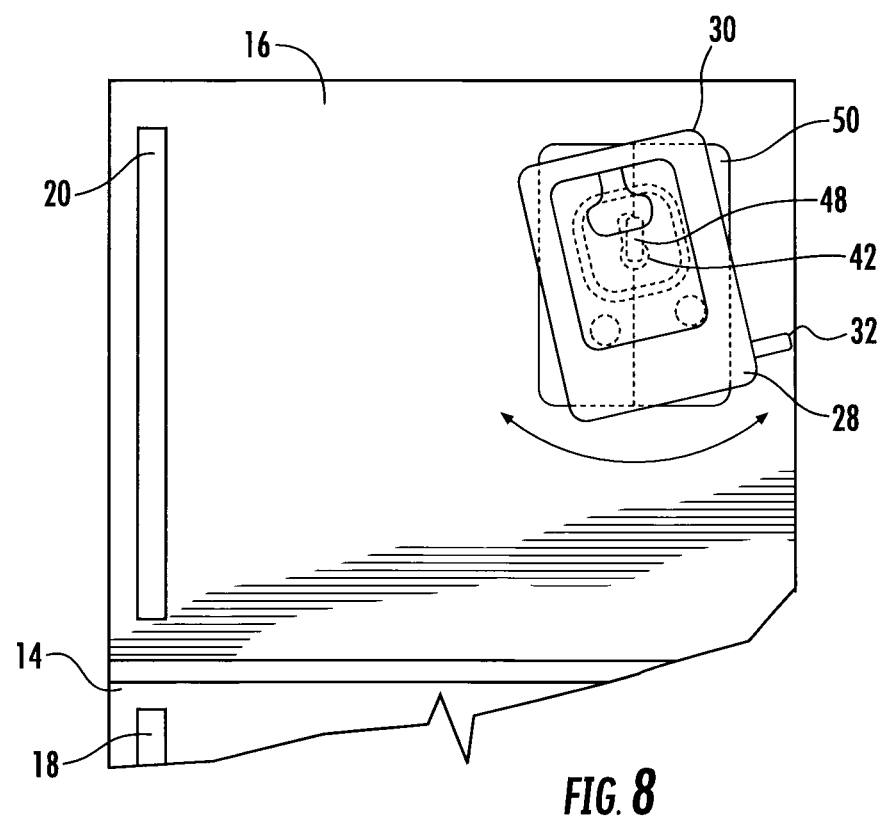
FIG. 8 is an elevated front view showing the engagement of the water dispensing housing to the appliance.

FIG. 8 discloses a front elevation view of the removable water dispenser 30 as it is attached to the hook 48 onto the door 16. Because of the hook 48 and keyhole 42 design of the attachment, a user may first place the dispenser 30 and the keyhole 42 over the hook to hold the dispenser 30. The user may then rotate the removable water dispenser 30 such that the removable water dispenser 30 is level and thereafter fixedly attach the dispenser 30 to the door 16 via an adhesive or other engagement device(s) such as via magnets or screws. In this manner, the user is able to easily ensure that the dispenser is level before final attachment.

Figure 9:
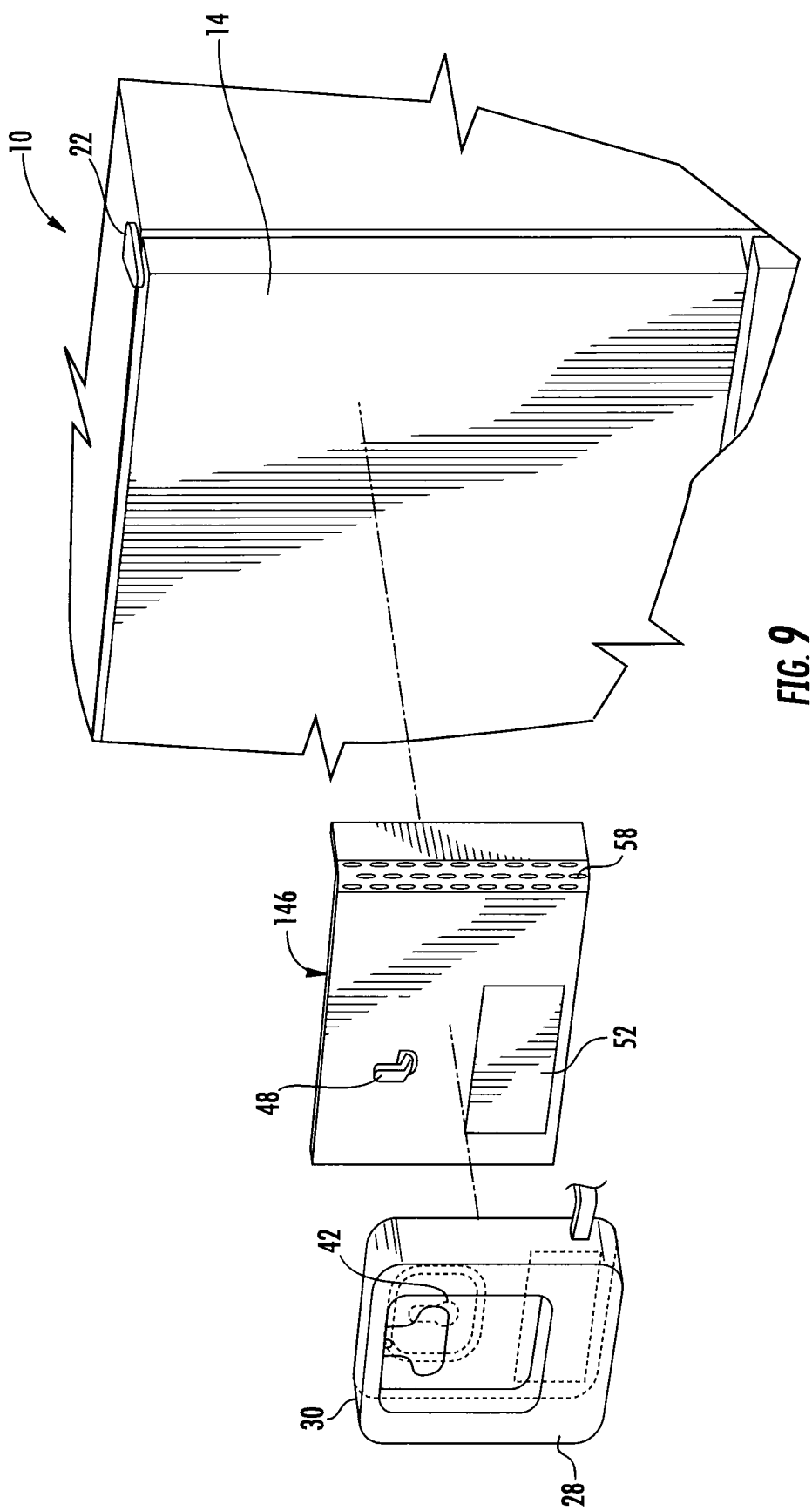
FIG. 9 is an exploded view of the removable water dispenser and a hook assembly according to another aspect of the present disclosure.

FIG. 9 discloses another embodiment of the hook assembly. This embodiment of the hook assembly is generally designated with numeral 146. The base 146 may include a hinge or bend 58. The hinge or bend may be a 90 degree angle from the main portion of the hook base 146. The hinge or bend 58 may be configured to wrap around a side of the door 14 as shown in FIG. 9. This may help locate the hook base 146 in a level position on the refrigerator 10, as well as in a convenient position laterally on the door 14. The hook base 146 may also have a removable adhesive strip 52 to hold the removable water dispenser 30 in place once it is installed onto the hook base 146. The bend 58 may be made of any elastomeric or movable material to allow for ease of installation. The elastomeric material may be a rubber or rubber-like elastomeric material such as SANTOPRENE™ from EXXONMOBIL®. SANTOPRENE™ is a thermoplastic elastomer (TPE) family of polymers that are closest in elastomeric properties to EPDM, ethylene propylene diene monomer (M-class) thermoset rubber. It is produced by combining the characteristics of vulcanized rubber with the processing properties of thermoplastics. In fact, the entire hook base could conceivably be produced of elastomeric material or just the bend with the remainder plastic or metal or other more rigid material than the elastomeric material of the bend 58.

Figure 10:
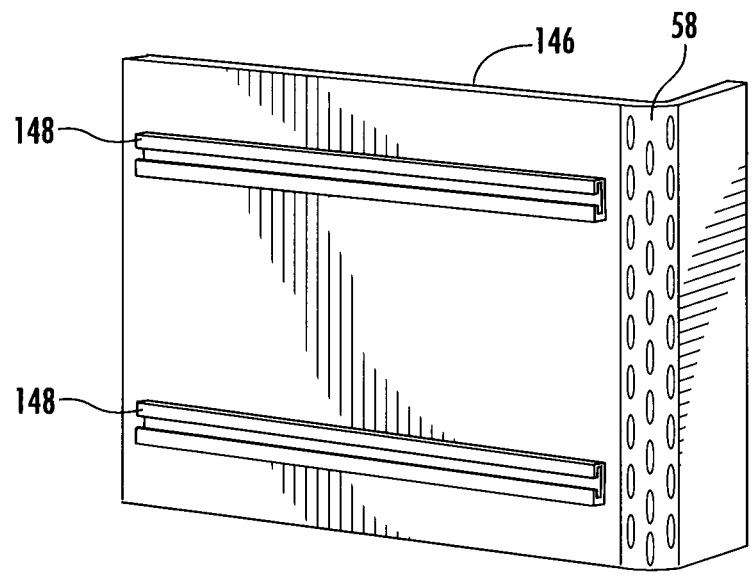
FIG. 10 is a perspective view of an alternative attachment arrangement to removably engage the removable water dispenser.
Figure 11:
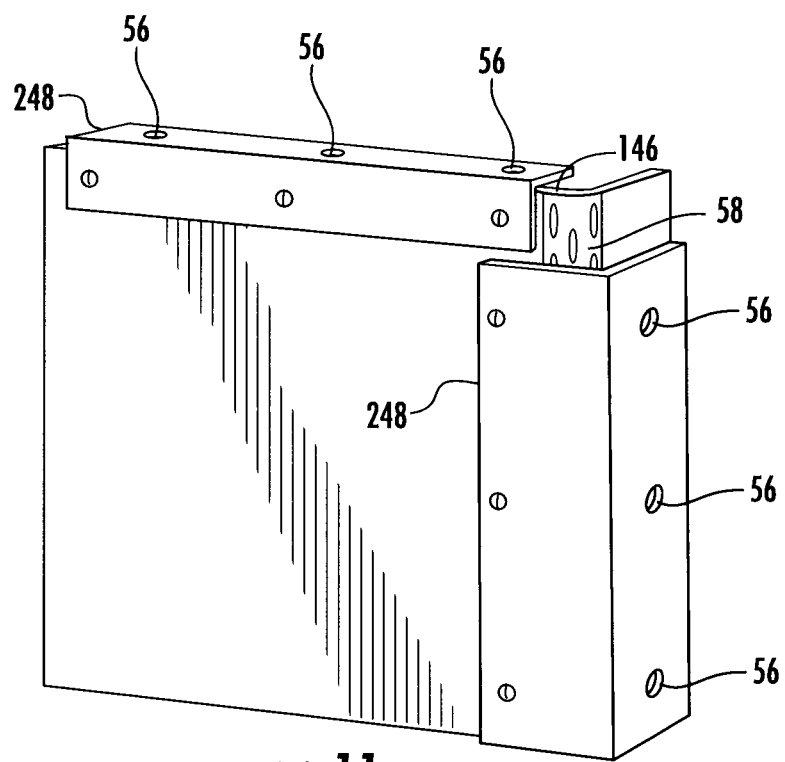
FIG. 11 is a perspective view of yet another alternative attachment arrangement incorporating one or more L-brackets having fastener holes.

The hook base 146 as shown in FIGS. 10 and 11, may also include alternative attachment arrangements. In FIG. 10, the hook base 146 may include a pair of C-channels 148. The removable water dispenser 30 may include knobs (not shown) or other elements that may be slidably engaged with the C-channels 148. The C-channels 148 may provide the retention necessary to hold the removable water dispenser 30 in place as well as provide enough friction to keep the removable water dispenser 30 from sliding back and forth.

FIG. 11 shows the hook base 146 with a pair of L-brackets 248. The L-brackets 248 may include one or more fastener holes 56. The removable water dispenser 30 may include corresponding apertures to allow a fastener to be inserted into the fastener holes 56 and hold the dispenser 30 in place on the hook bracket 146.

Figure 12:
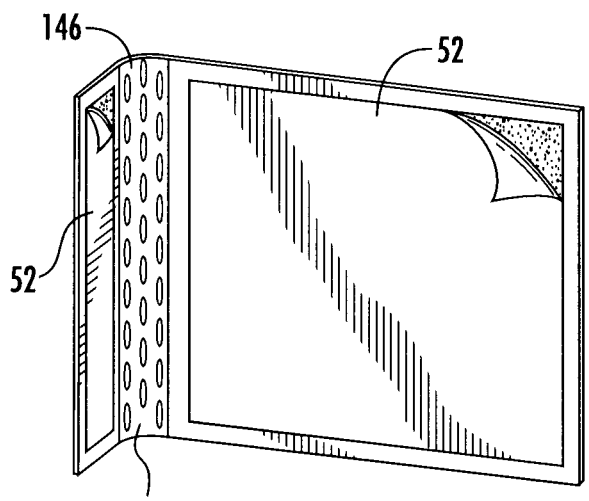
FIG. 12 is a rear perspective view of an attachment mechanism according to the present disclosure incorporating one or more adhesive strips with peel off protective sheets that are removed to expose the adhesive.
Figure 13:
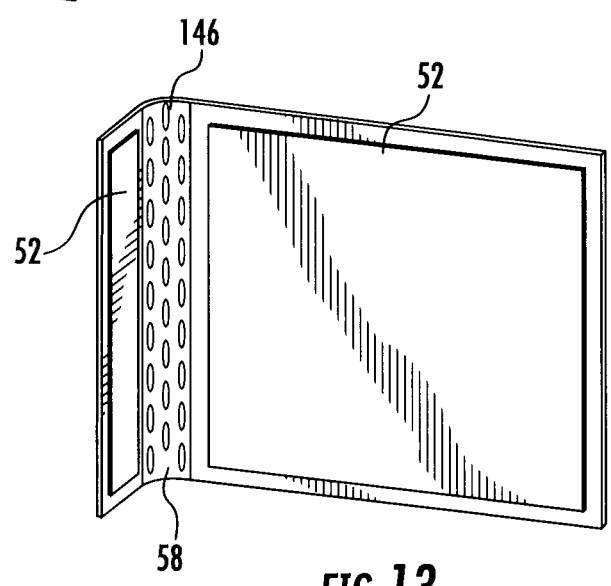
FIG. 13 is a perspective view of the attachment arrangement of FIG. 12 without the peel off protectant removed to expose the adhesive.
Figure 14:
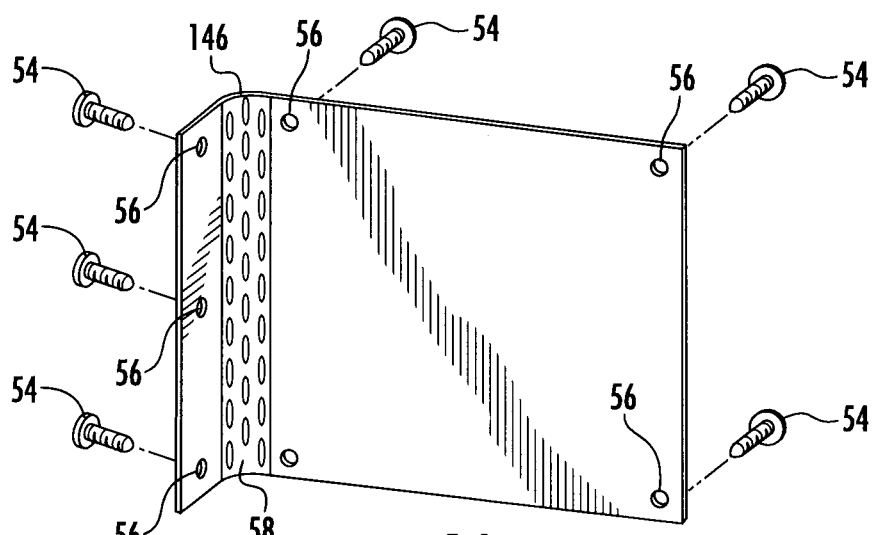
FIG. 14 is a perspective view showing an alternative attachment system using screws or other fasteners to engage the attachment arrangement to an appliance.

FIGS. 12, 13, and 14 disclose an attachment method to attach the hook base 146 to the refrigerator door 16. As shown in FIG. 13, the hook base 146 may have one or more adhesive strips 52. As shown in FIG. 12, the adhesive strips may have a film that may be removed to expose the adhesive surface. The strips do not necessarily need to be rectangular-shaped, but could be any shape, such as circular or oval. The hook assembly may then be attached to the refrigerator 10 and held in place by the adhesive strips 52. FIG. 14 shows the hook assembly with a number of fastener holes 56 and fasteners 54 for holding the hook base in place on the refrigerator doors 16. In this embodiment, the door 16 may require corresponding holes for the fasteners 54 to attach to.

Figure 15:
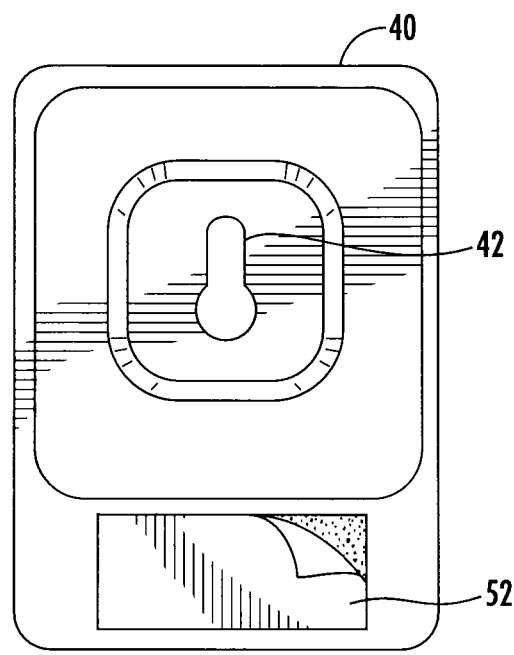
FIG. 15 is an elevated rear view of the water dispenser housing showing an adhesive being exposed to facilitate mounting of the dispenser to the appliance.

As shown in FIG. 15, the removable water dispenser 30 may also include an adhesive strip 52 on a back side of the backplate 40. The adhesive strip 52 may correspond to an adhesive strip 52 on the hook base 146. This adhesive strip 52 may allow for better retention to the hook assembly 146 when the water dispenser is installed onto the refrigerator door 16. The adhesive strips, when described in the present disclosure may simply be adhesives, but are typically adhesive portion or strips that are protected by a peel off layer until peeled off to activate the adhesive portion.

Figure 16:
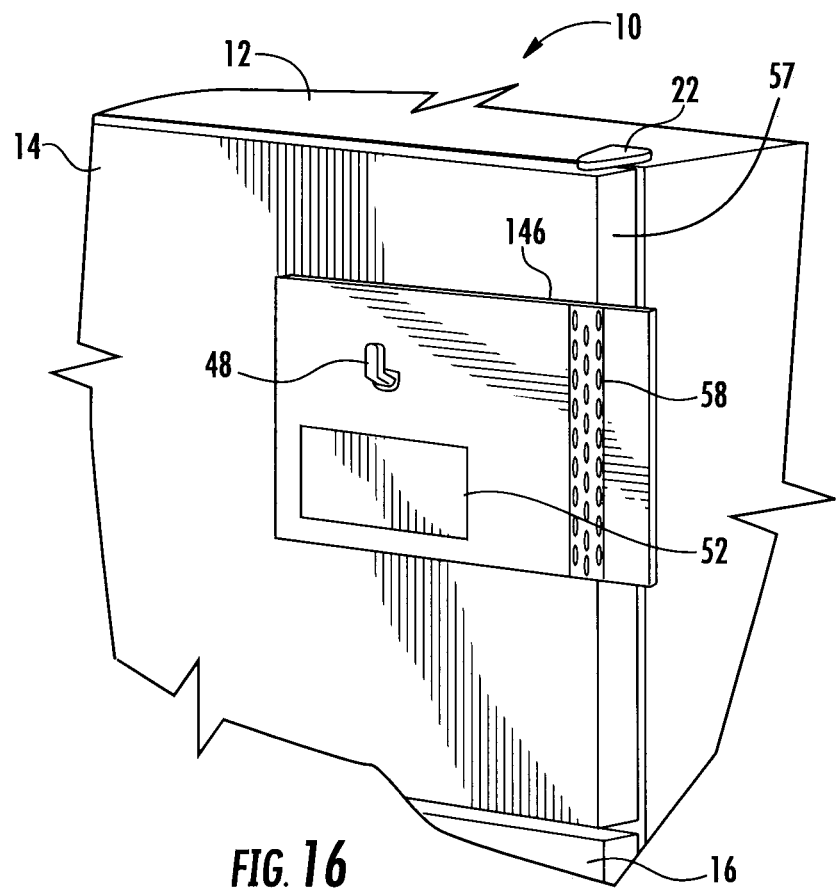
FIG. 16 is a perspective view showing the engagement of the attachment arrangement to an appliance in its initial state.
Figure 17:
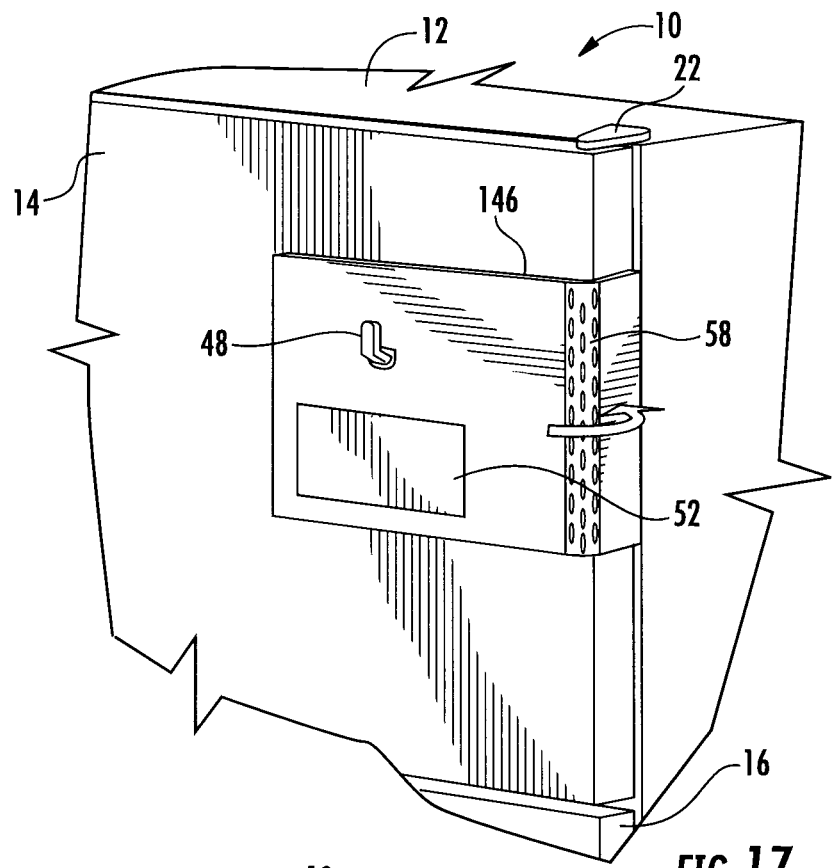
FIG. 17 shows a second stage of the engagement process of the attachment arrangement of FIG. 16 where the side panel is bent to engage a side portion of an appliance door utilizing a flexible portion to allow the attachment portion to bend.
Figure 18:
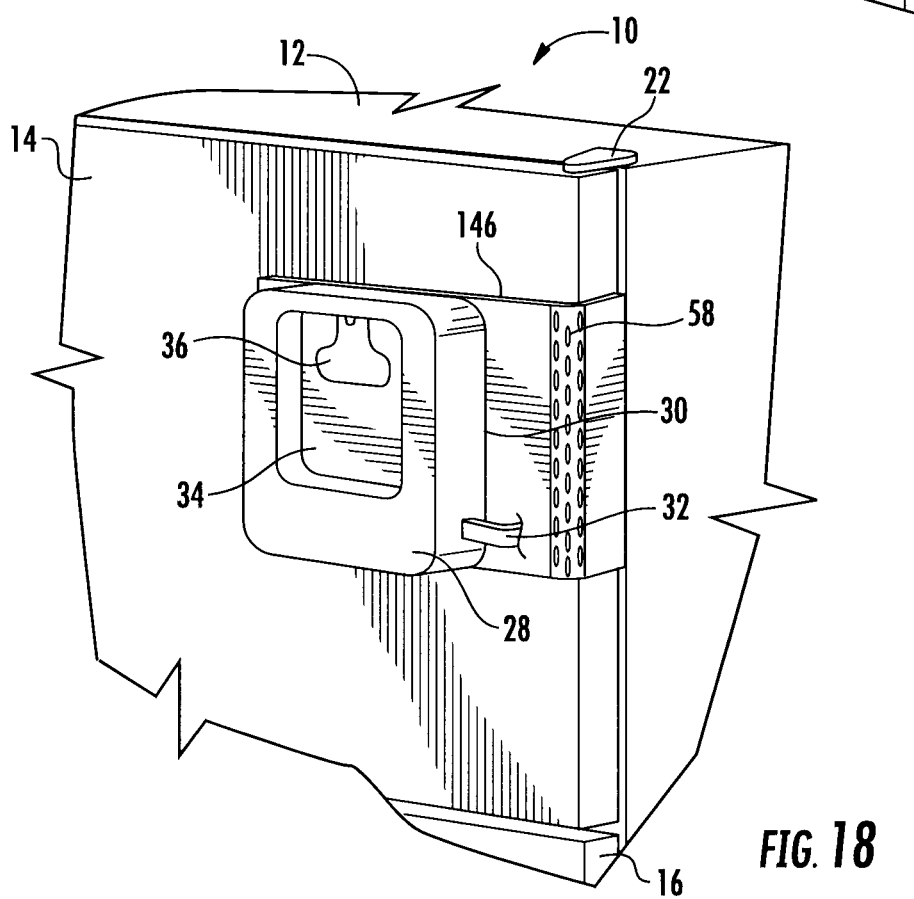
FIG. 18 is the next stage in attaching the removable water dispenser system where the main housing of the water dispenser is engaged to the attachment arrangement.

FIGS. 16-18 show various stages of a method of attaching the hook assembly 146 to the refrigerator door 14. In an initial stage shown in FIG. 16, a user may attach the hook base 146 to the door 14 with the hinge 58 extended beyond the end of the door 14. Then, as shown in FIG. 17, the hinge 58 is bent over the end of the door 14, and the adhesive strip 52 that is on the appliance facing side of the lateral part of the hook assembly 146 is then attached to the side portion 57 of the door 14, typically by an adhesive. In FIG. 18, the removable water dispenser 30 then may attach to the hook base 146 by sliding the keyhole slot 42 over the hook 48 and rotating the dispenser 30 down such that the adhesive strip 52 on the hook base 146 matingly engages the adhesive strip 52 on the back side of the base plate 40, holding the water dispenser in place on the door 14.

Figure 19:
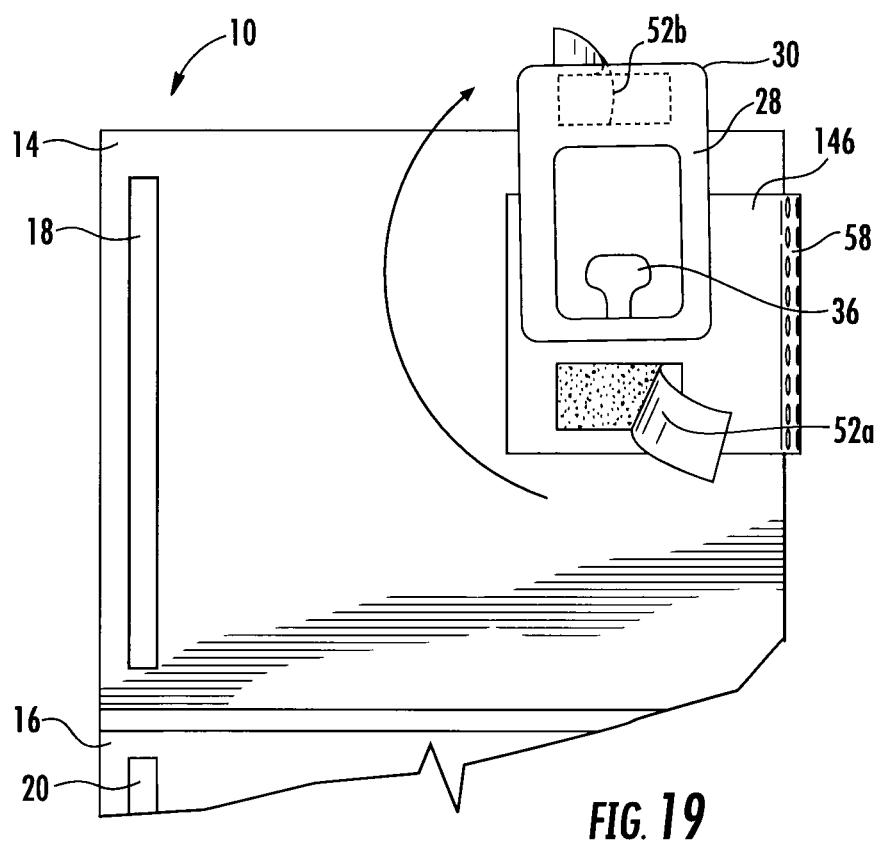
FIG. 19 is an elevated front view showing an alternative attachment mechanism incorporating an adhesive that is exposed by peeling off protectant covering therefrom off the appliance facing surface of the water dispenser and the water dispenser facing surface of attachment arrangement.
Figure 20:
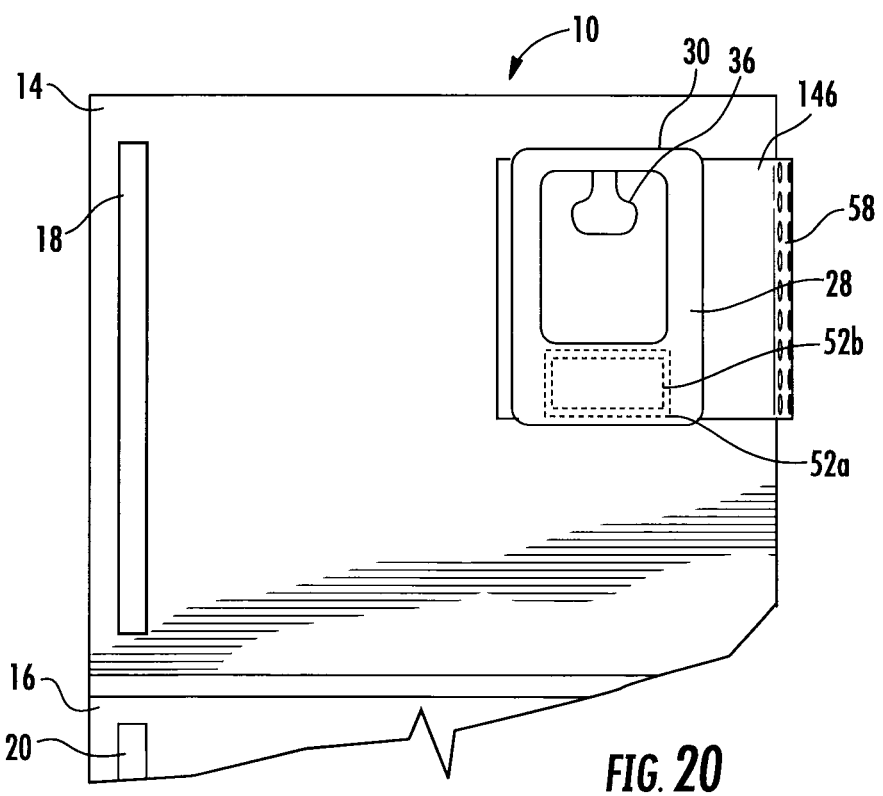
FIG. 20 is an elevated front view showing the water dispenser engaged with the attachment arrangement.

In another embodiment, as shown in FIGS. 19 and 20, the water dispenser 30 may be attached to the hook 48 by the keyhole slot 42, rotated up such that adhesive strip 52*b* is above the top of the door 14, the removable film may be removed from the adhesive strips 52*a* on the hook base 146 and 52*b* on backplate 40, and then rotated down such that the adhesive 52*a* and 52*b* line up as shown in FIG. 20.

Figure 21:
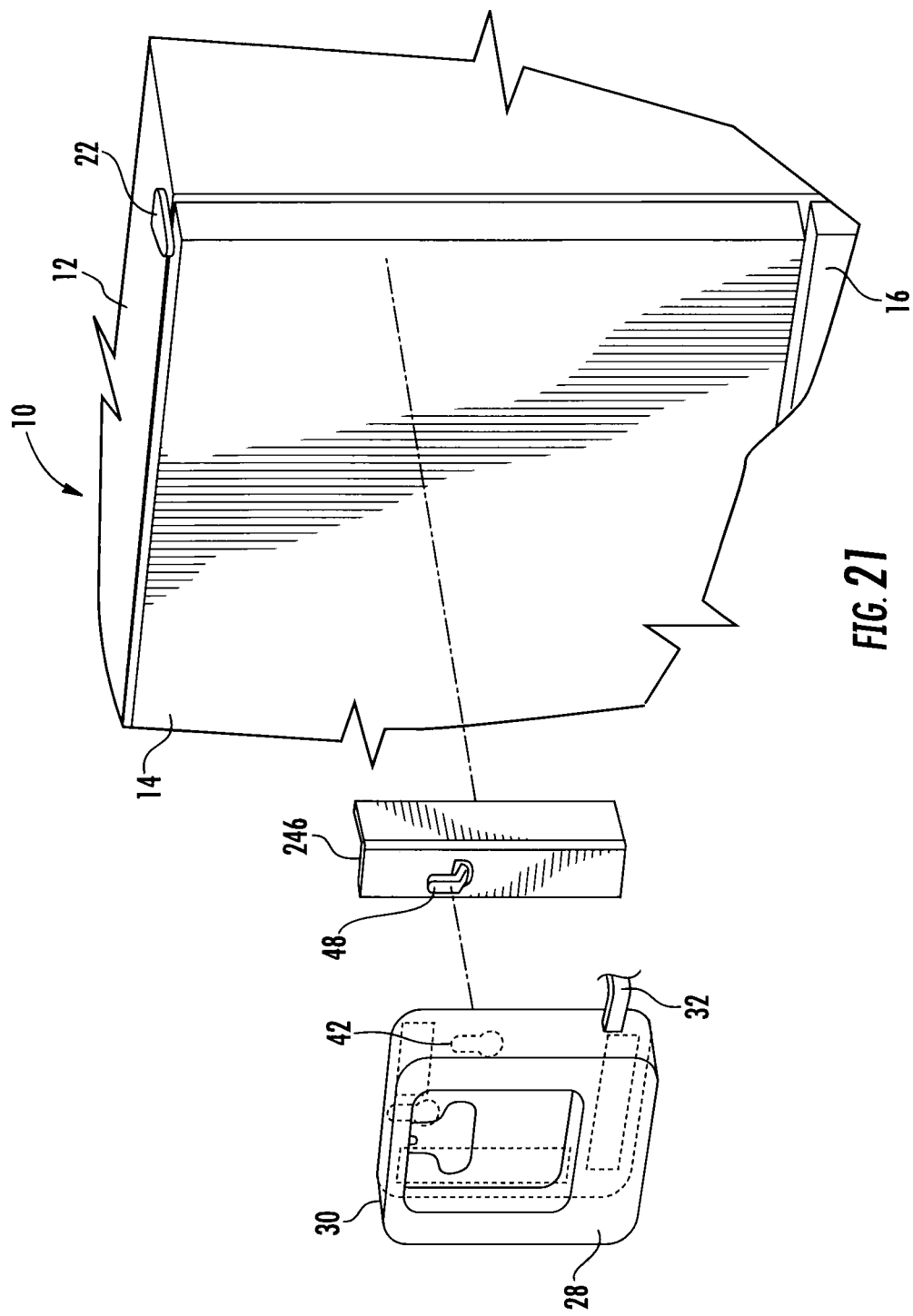
FIG. 21 is an exploded view of an alternative attachment arrangement according to the present disclosure.
Figure 22:
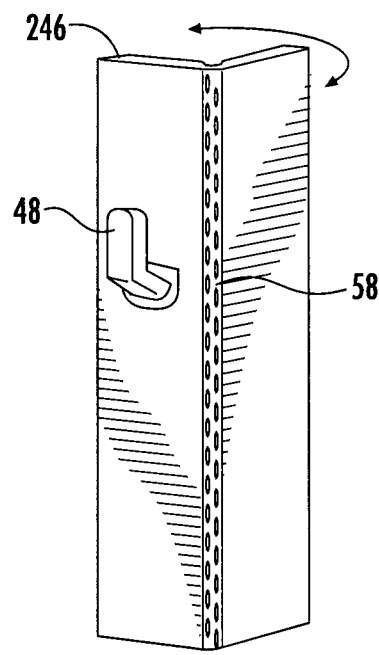
FIG. 22 is a perspective view of the attachment arrangement shown in FIG. 21.
Figure 23:
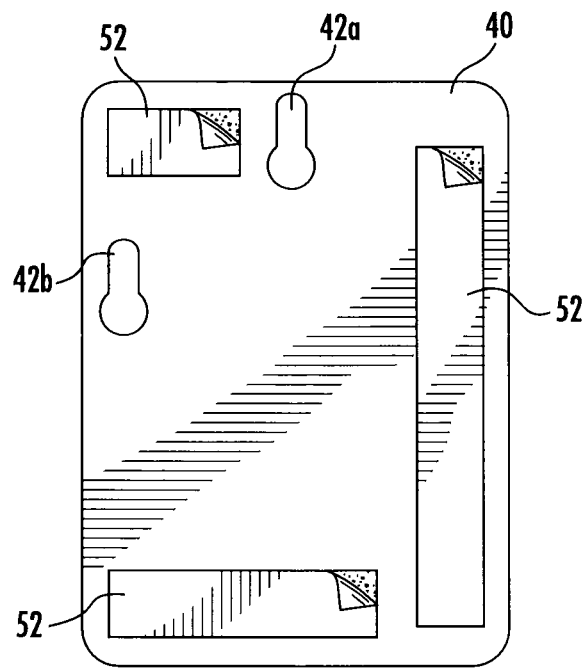
FIG. 23 is an elevated rear view of the water dispenser of the exploded view shown in FIG. 21 incorporating peel off adhesive.
Figure 24:
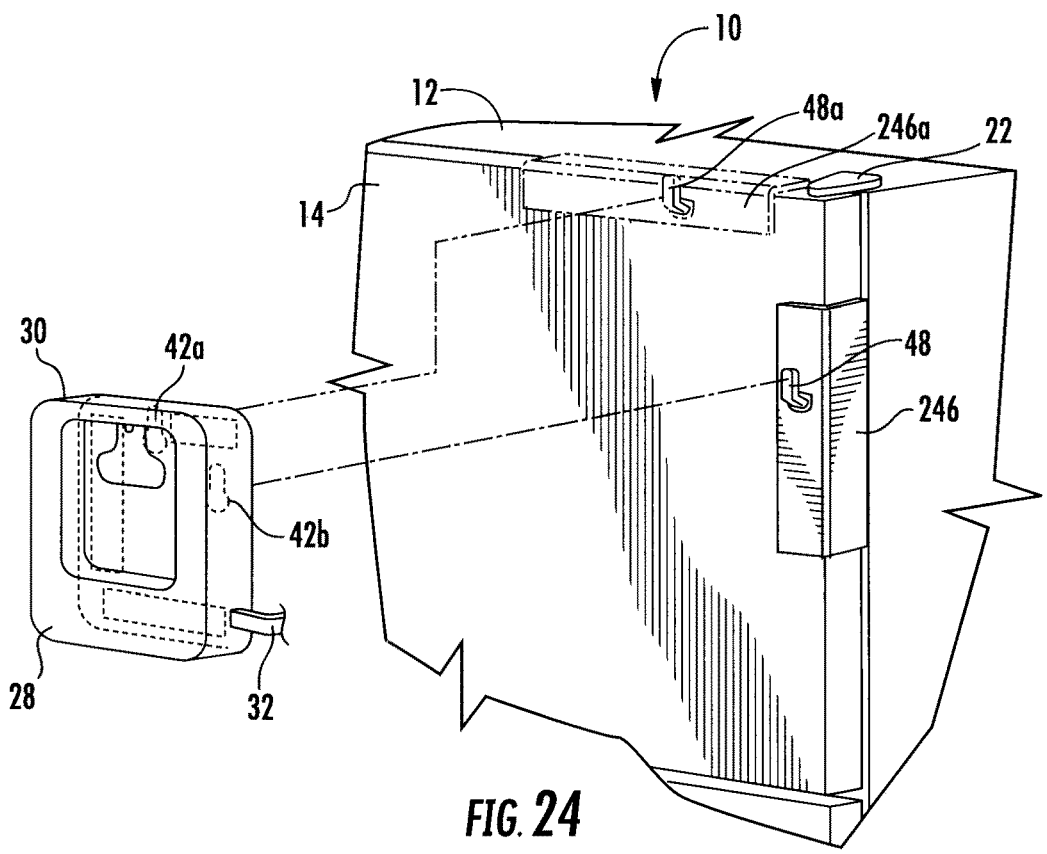
FIG. 24 is a partial exploded view showing the water dispenser removed from the attachment arrangement but the attachment arrangement is shown engaged to a front and side of a door of an appliance.
Figure 25:
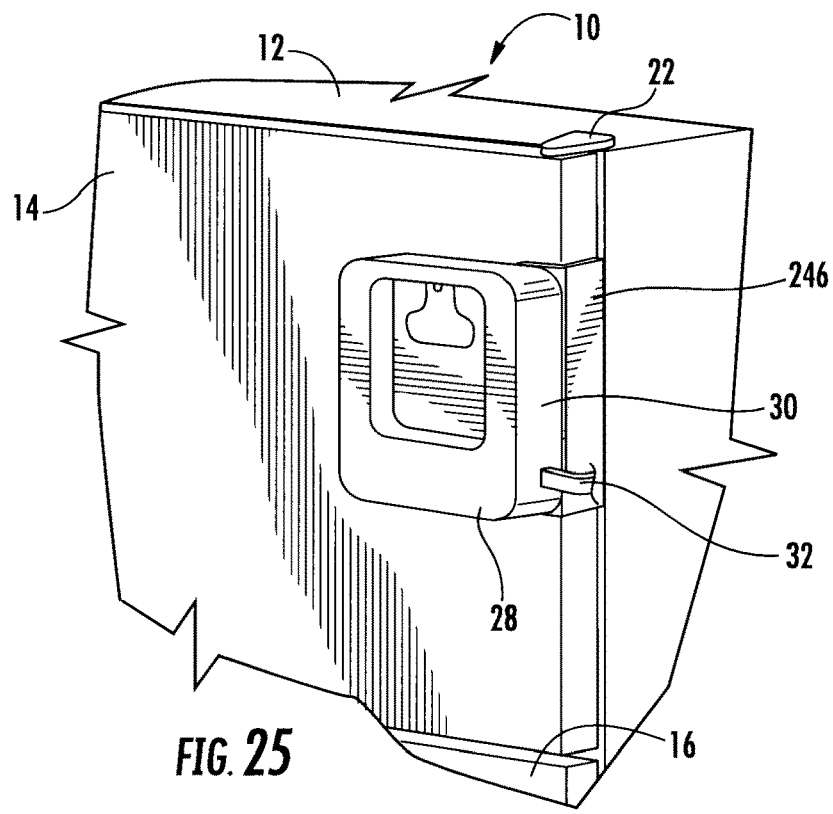
FIG. 25 is a perspective view showing the water dispenser engaged to the attachment arrangement depicted in earlier FIGS. 21-24.

In still another embodiment, as shown in FIG. 21, the hook assembly 246 has a hook 48. Similar to previous embodiments, the hook 48 corresponds to a keyhole slot 42 on the back of the removable water dispenser 30. As shown in FIG. 22, the hook assembly 246 may also have a living hinge that may be rotated 90 degrees upon installation on the refrigerator 10. The backplate 40 may have a second keyhole slot, the keyhole slots shown as 42*a* and 42*b*, in FIG. 23. The hook assembly 246 of this embodiment may be used in conjunction with a second hook assembly 246*a*, as shown in FIG. 24. The hook 48*a* may correspond to the second keyhole slot 42*a* and a hook 48 may correspond to hook 48 offering two positions to hold and locate the dispenser 30. Instead of having a second hook, the dispenser 30 may use a single hook assembly 246 in conjunction with a number of adhesive strips 52, as shown in FIG. 23. The hook and adhesive combination may be used to locate the dispenser 30 and hold it in place, as shown in FIG. 25.

Figure 26:
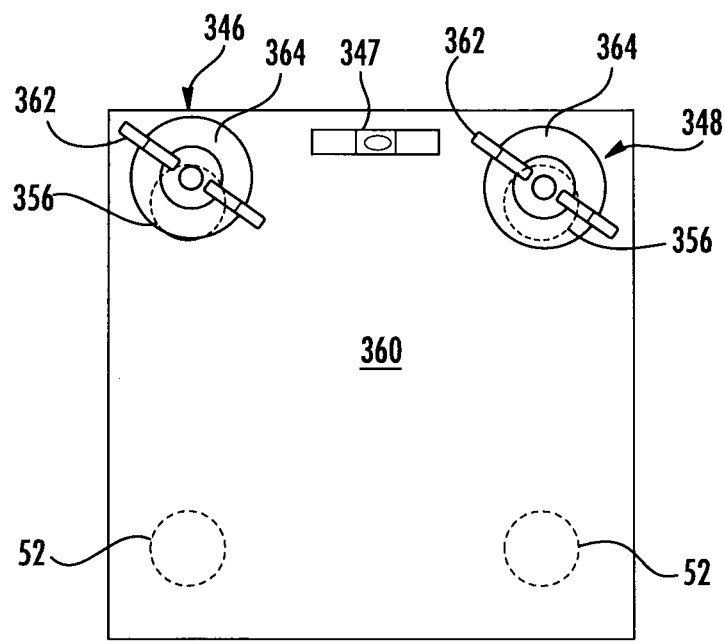
FIG. 26 is an elevated front view of an alternative attachment arrangement utilizing adhesive stick on studs and a nut and washer arrangement to allow for easy installation of the attachment arrangement onto the front surface of the appliance.
Figure 27A:
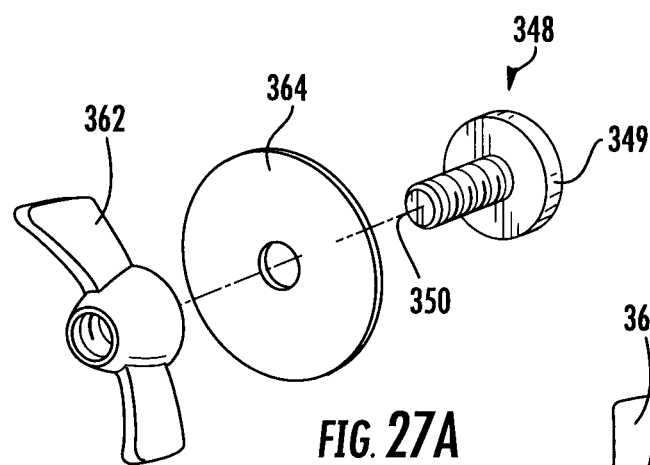
FIGS. 27A and 27B are each a perspective view of the bolt-shaped hook and nut and washer used to engage the attachment arrangement shown in FIG. 26.
Figure 27B:
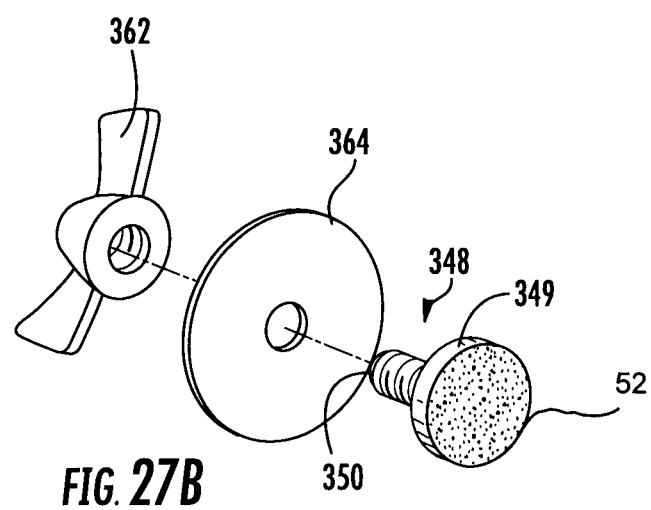

FIG. 26 shows still another embodiment of the attachment arrangement base 346 and hook 348. As discussed above, it should be understood in any embodiment of the present disclosure that a "hook" does not necessarily need to have a bent portion, but can simply be similar to a bolt with a straight appendage as well that can be unthreaded or, in the case of the embodiment shown in FIG. 26, threaded to receive a wing nut 362 and washer 364. The "hook" receives or otherwise engages the dispenser. In the embodiment of FIG. 26, hook 348 (see isometric view FIG. 27) has a base portion 349 and an attachment portion 350. In certain embodiments, the attachment portion 350 may be threaded. The attachment arrangement base 346 may also include a level 347 for a user to ensure that the attachment arrangement base 346 is placed correctly. In this embodiment, the user may place the hook 348 with base portion 349 against the refrigerator door using an adhesive on the appliance facing side of the hook 348 such that the base portion is engaged to the appliance and the attachment portion 350 extends away from the appliance. The hook base may then be located and placed on the door over the hook 348 through apertures 356. The hook base may be adhered to the refrigerator door by an adhesive portion 52 that is on the appliance facing side of the attachment arrangement base 346. The user may not need to locate the hook 348 perfectly, because the hook base 346 has an aperture 356 that is sized to allow some float between the attachment arrangement base 346 and the hook 348. This allows a user to roughly locate the hook first, and use the level 347 to locate and adhere the hook base to the door more finely using the level attached to the hook base 346 as a location aid. Thereafter, once level, the attachment arrangement base portion may be removably engaged to the appliance by hand and without the use of tools by using a nut, such as a wing nut and a washer to engage the dispenser facing side 360 of the attachment arrangement base 346.

Figure 28:
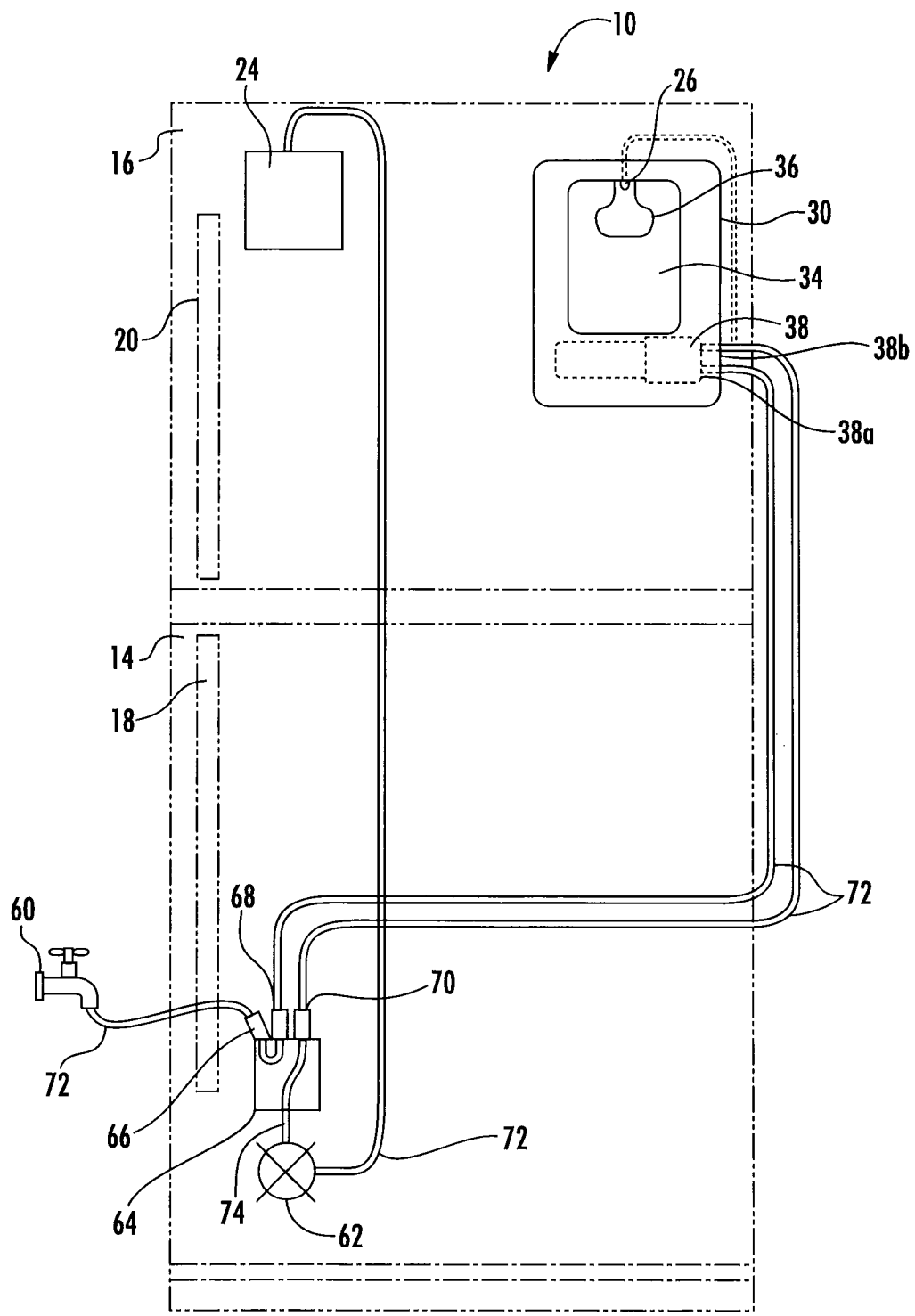
FIG. 28 is an elevated front transparent view showing the removable water dispenser engaged to a front surface of the appliance and the water conduits that may be utilized in an embodiment in an aspect of the present disclosure.

FIG. 28 shows schematically how an embodiment of the water dispenser system may function. The refrigerator 10 may have an ice maker 24 located in the freezer compartment 16. However, it should be noted that the ice maker may be located in a fresh food compartment, the fresh food compartment may be disposed above the freezer compartment, or could be any combination therein as known in the art. The locations shown are arbitrary for the purposes of schematically showing the system interactions. The dispensing system may include a manifold 64 that is connected to a source of household water 60 via a water line 72 to a first inlet 66, which may be an untreated water inlet 66. The manifold may have a first outlet 68 which leads to an inlet 38*a* on the water filter 38. The manifold 64 may also have a filtered water inlet 70 which leads from an outlet 38*b* of the water filter 38. The manifold 64 may have a second outlet 74 which is connected to a water valve or solenoid 62.

Figure 29:
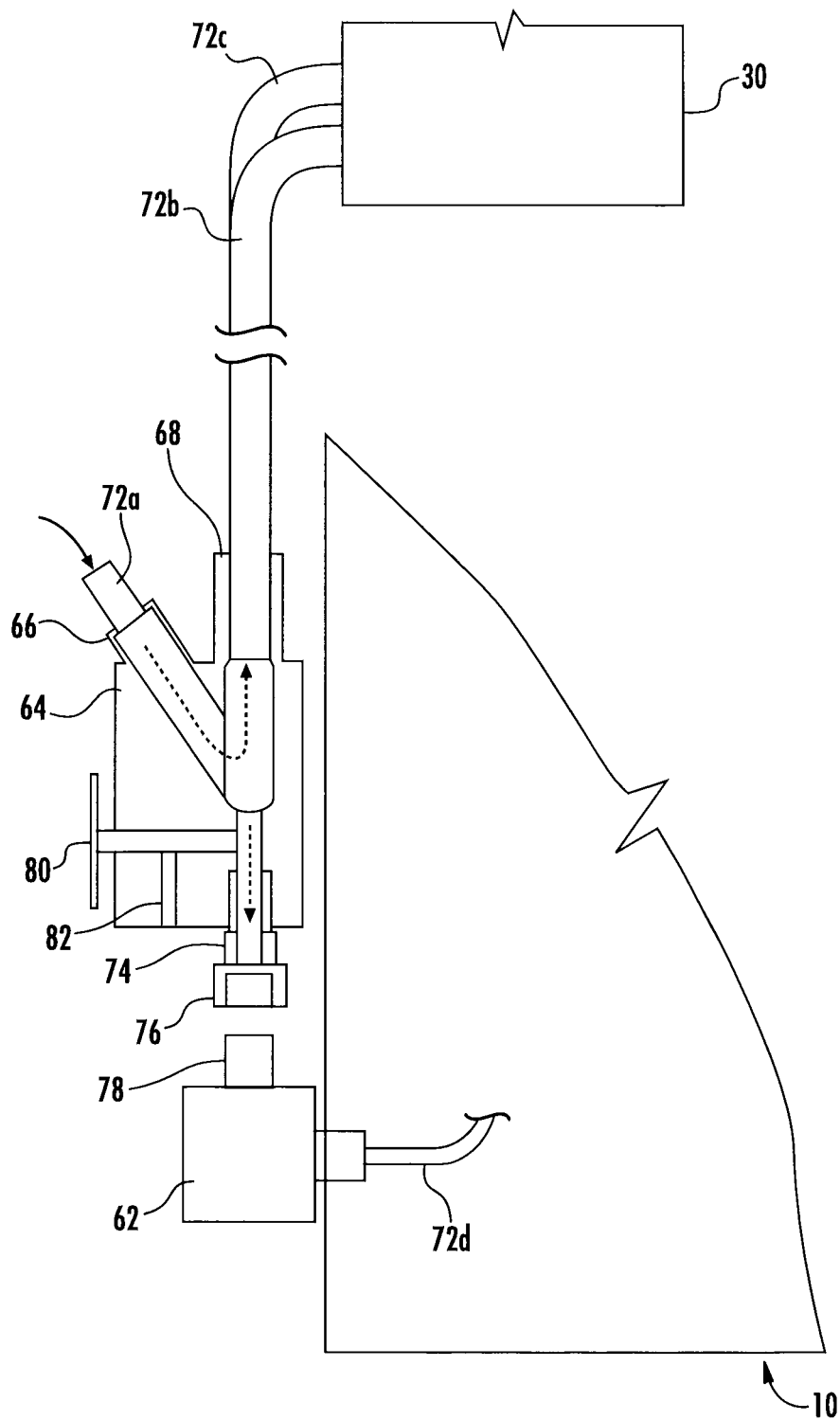
FIG. 29 is a partial schematic view of a manifold assembly connection system that may be utilized in accordance with the present disclosure.

A water valve or solenoid 62 may be connected to the ice maker 24 via another water line 72. In this way, the manifold directs water to the water filter, which then directs water to the dispensing nozzle 26 and the ice maker 24 either directly via a water line or indirectly back through the manifold and an ice maker valve 62. As shown in FIG. 29, the water valve or solenoid 62 may be directly connected to the second outlet 74 via a male connection 78 to female connection 76 on the manifold 64. While shown as disengaged in FIG. 29, the connections are fluidly connected in operation. The manifold 64 may also have an air bleed valve 80 which may be pulled out to allow air to escape through the tube 82, and out to ambient air.

Figure 30:
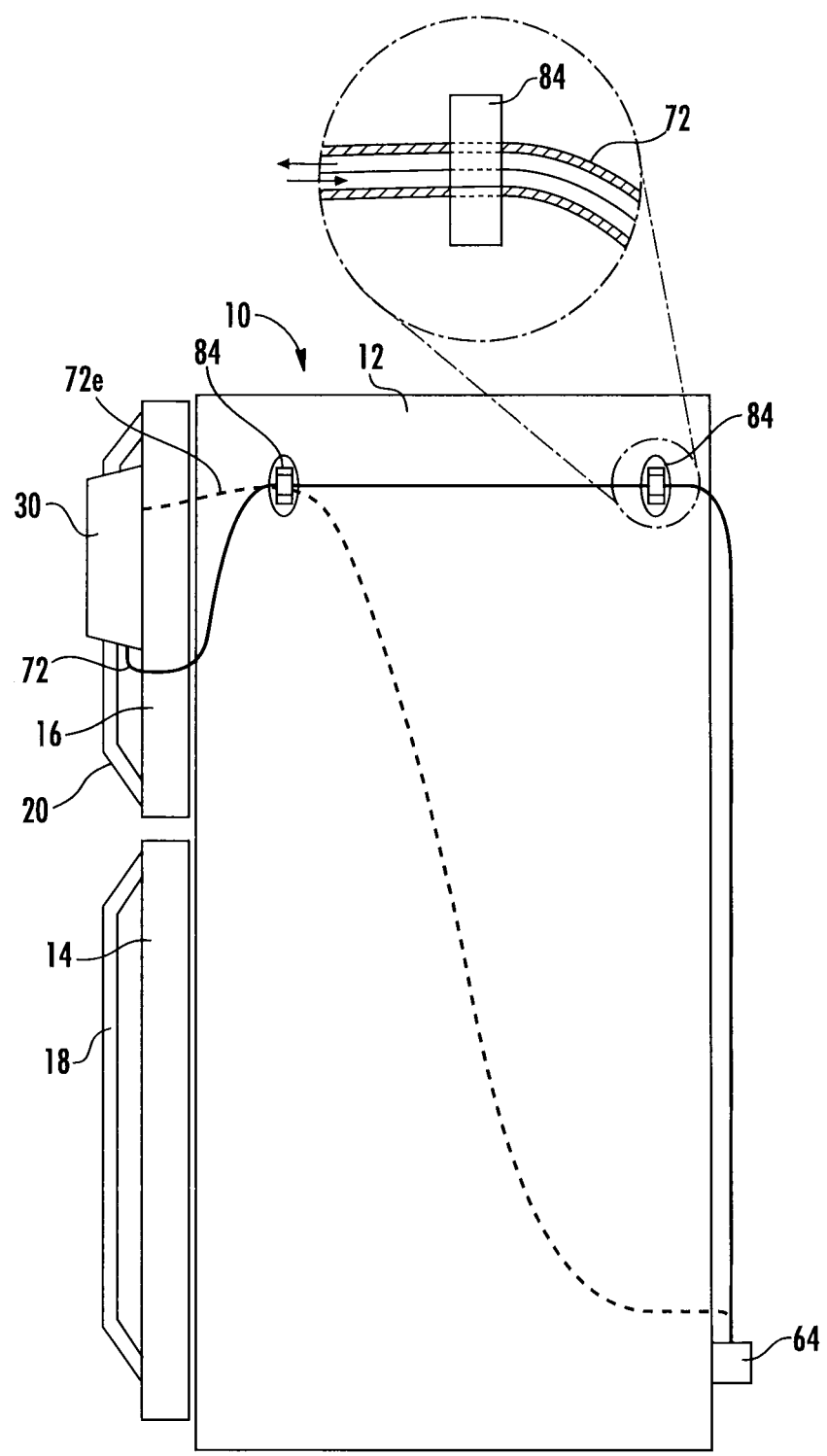
FIG. 30 is an elevated side view of an appliance having the removable water dispenser engaged to the front surface thereof showing a water line control system.

FIGS. 30-33 describe various methods and systems to control the water lines from the dispenser 30 to the manifold 64. FIG. 30 shows the water line 72 being held to the side of the cabinet 12 of the refrigerator 10 via an eyelet 84. While the embodiments shown in the Figures show the dispenser on a door or the front of the refrigerator, the dispenser may be located in a side of the refrigerator or on a side of another appliance or cabinet.

Figure 31:
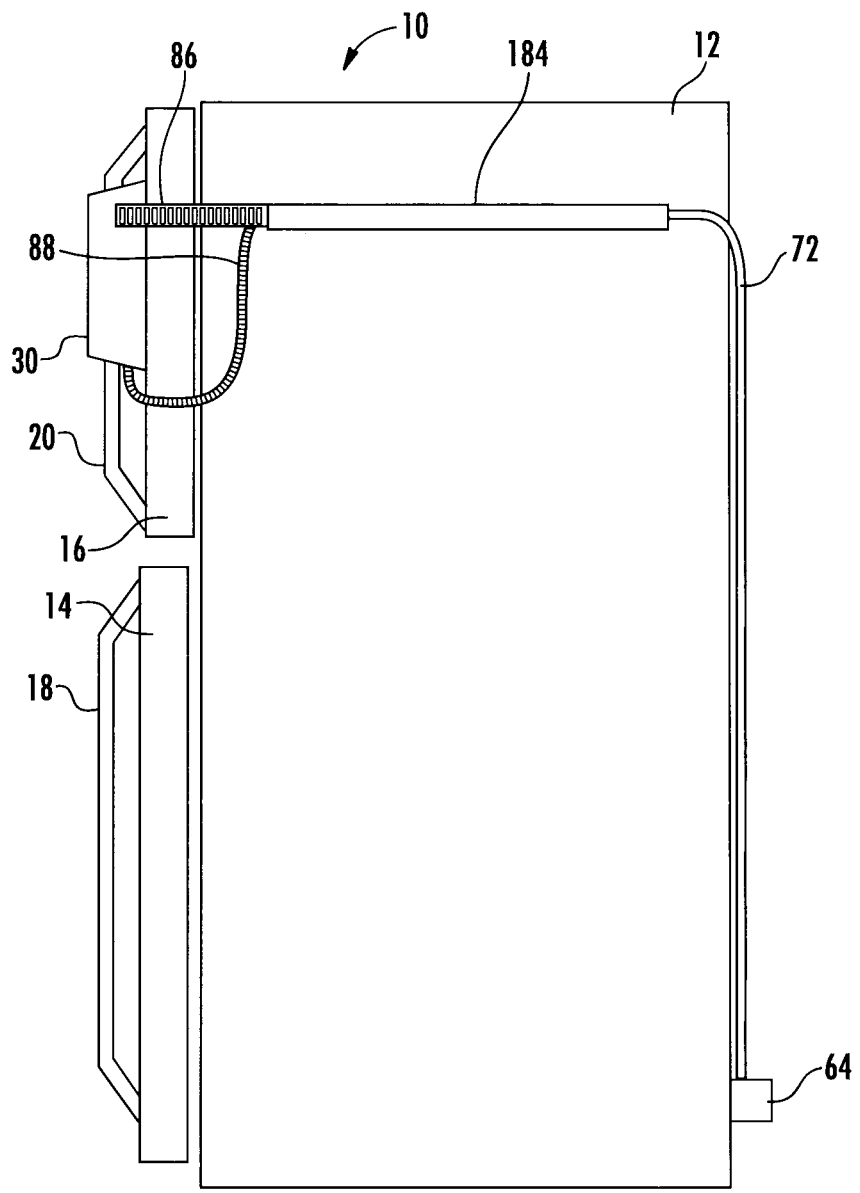
FIG. 31 is an elevated side view of an appliance having the removable water dispenser engaged to the front surface thereof showing an alternative water line control system.

The eyelet 84 may also have an adhesive or magnetic strip on it to hold it in place on the cabinet 12. There may also be a second eyelet 84 substantially at the same height as the first eyelet such that the eyelets 84 are positioned one near the front of the cabinet and one at the rear of the cabinet 12. Any number (a plurality) of eyelets could conceivably be used. As shown in FIG. 31, the water line 72 may be routed on the side of the cabinet 12 via a directing tube 184 attached to the cabinet 12. Located between the locating tube 184 and the dispenser 30, there may be a linked track 86 that is able to support the slack in the water line 72 as the freezer door 16 is opened and closed, lengthening and shortening the distance between the dispenser 30 and the directing tube 184. Alternatively, there may also be a corrugated flexible plastic loom tubing 88 that leads from the tube 184 to the dispenser 30. This flexible tubing may also provide the slack necessary for the changing distance between the dispenser 30 and the tube 184.

Figure 32:
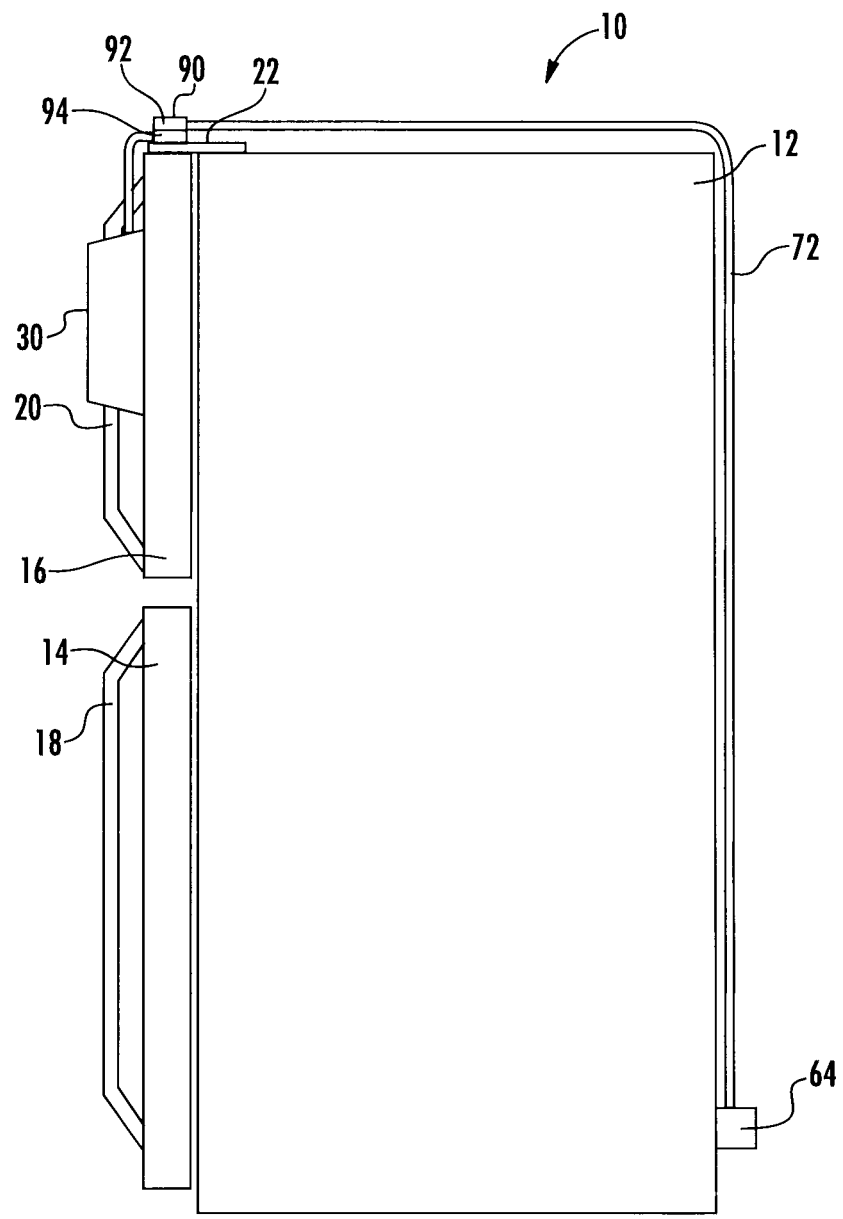
FIG. 32 is an elevated side view of an appliance having the removable water dispenser engaged to the front surface thereof showing yet another alternative water line control system.
Figure 33A:
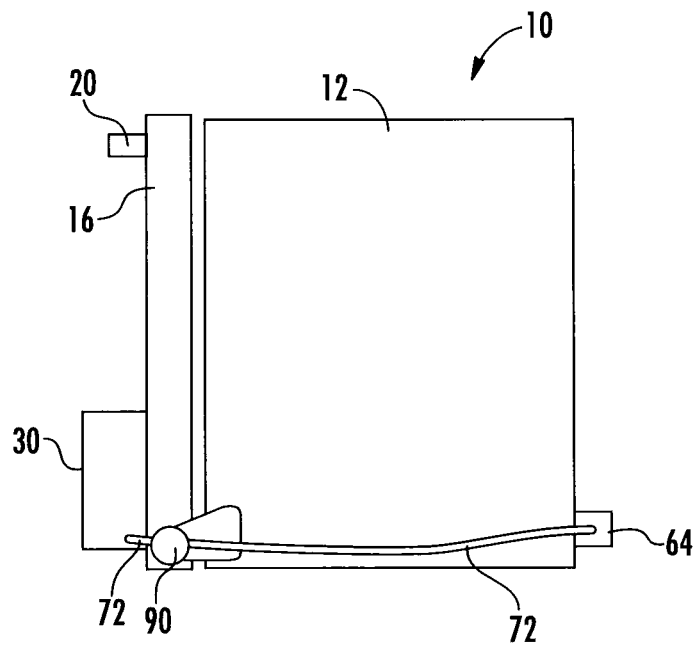
FIG. 33A is a top view of the water control line system shown in FIG. 32 where the appliance door is in the closed position.
Figure 33B:
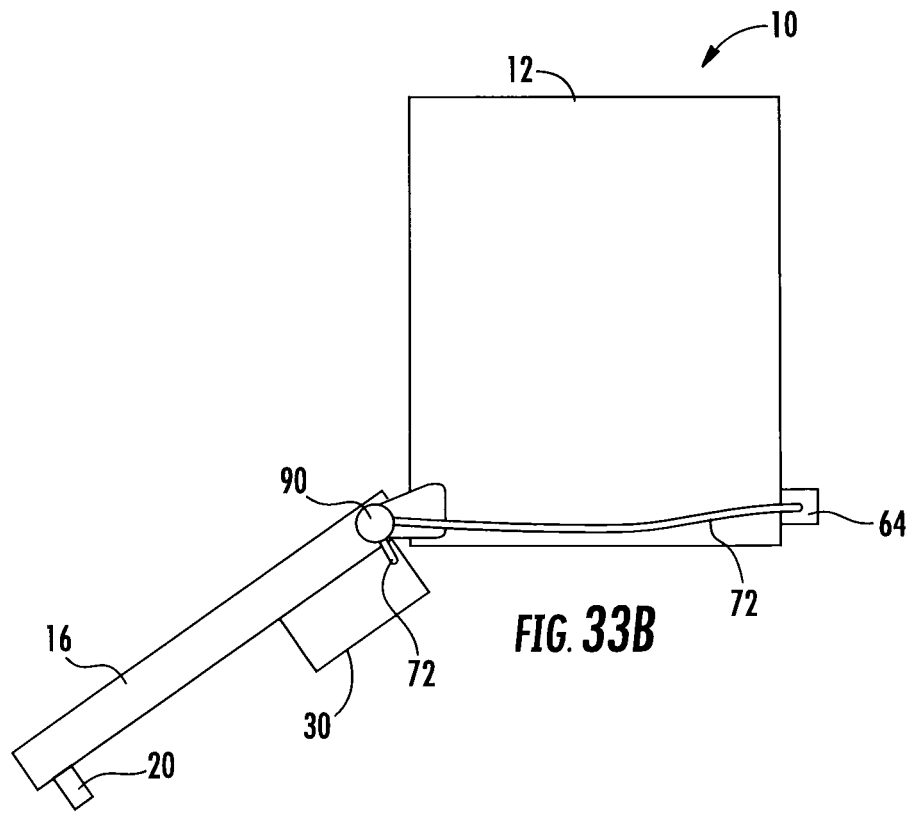
FIG. 33B is a top view of the water control line system shown in FIG. 32 where the appliance door is in the open position.

In another embodiment, as shown in FIG. 32, the dispenser may include a swivel joint 90 with an upper swivel 92 and a lower swivel 94. The lower swivel 94 may be coupled with the hinge 22 at the top of the door 16. The lower swivel 94 may be fluidly connected to the dispenser 30, such that the distance between the dispenser 30 and the lower swivel 94 never changes as the door 16 is opened and closed. The upper swivel 92 may be stationary with respect to the cabinet 12, such that the distance between the manifold 64 and the upper swivel 92 never changes when the door 16 is opened and closed. The upper swivel and lower swivel are fluidly connected internally such that as the lower swivel 94 rotates along with the door 16, the fluid connection is not interrupted. As shown in FIGS. 33A and 33B, as the door 16 is opened and closed the swivel joint remains in place with the upper swivel 92 remaining stationary with respect to the cabinet 12 and lower swivel 94 remaining stationary with respect to the door 16, however swiveling one upon the other. In this way, there need not be any slack in the water lines 72 either between the manifold 64 and the swivel 90, nor between the swivel 90 and the dispenser 30 as the distances between the elements does not change. The combination may also be reversed, with the upper swivel 92 rotating with the door and the lower swivel 94 remaining stationary with respect to the cabinet 12.

Figure 34:
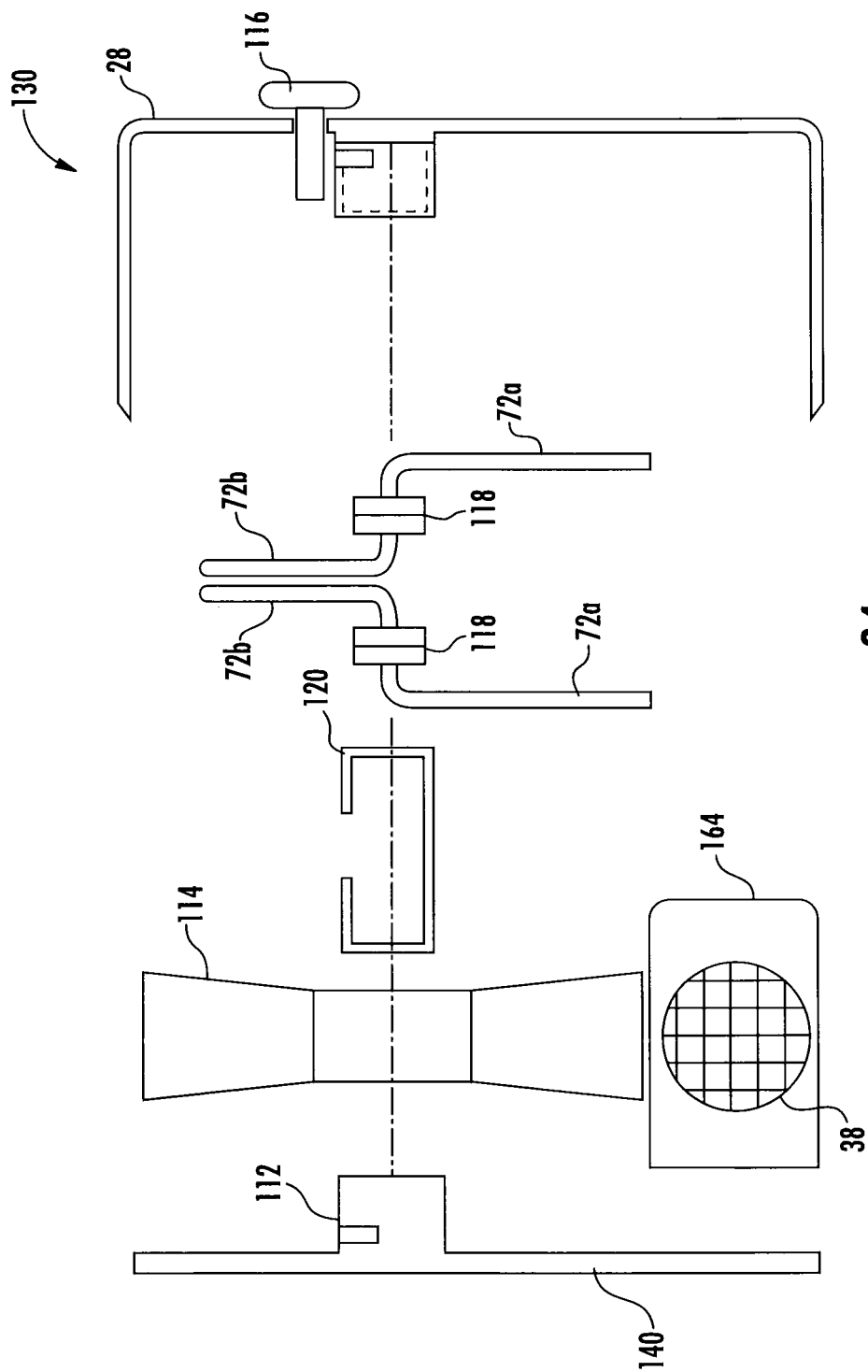
FIG. 34 is a exploded and schematic view of a removable water dispenser with active slack control.
Figure 36:
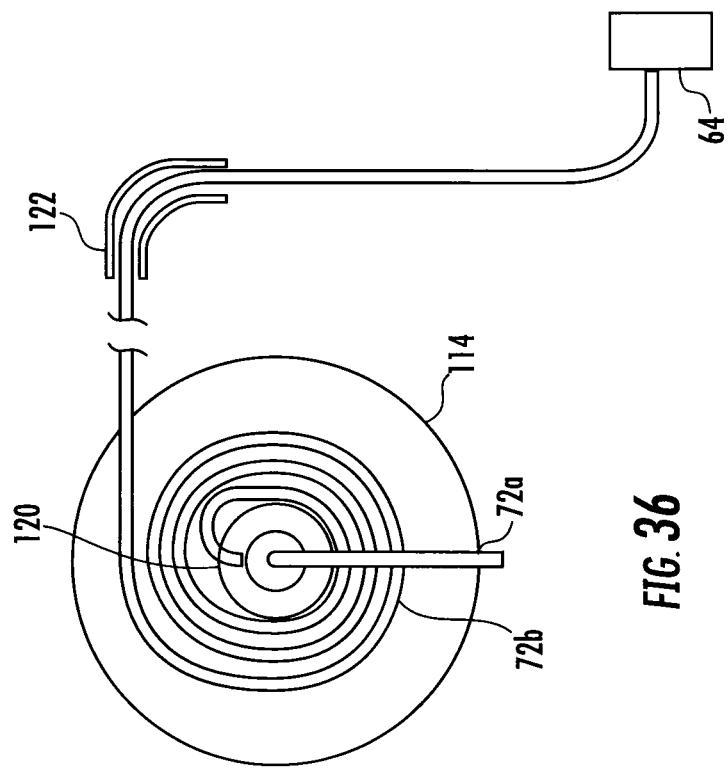
FIG. 36 shows a top schematic view of the tubing spool shown in FIGS. 34 and 35.
Figure 35:
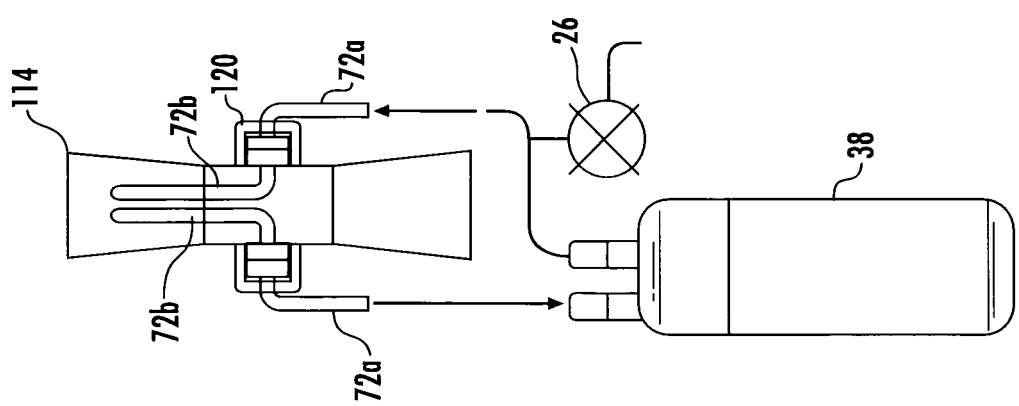
FIG. 35 shows a schematic end view of a tubing spool and filter configuration according to an aspect of the present disclosure.

In another embodiment, the slack in the water lines 72 is dynamically controlled using a system shown in FIGS. 34-38D. FIG. 34 details an exploded view of a dispenser 130 with dynamic or active slack control. The dispenser may include a backplate 140 that includes a C-sleeve protrusion 112. A tubing spool 114 may fit over the protrusion 112 and rotate about the protrusion 112. Aiding in keeping the spool in place and allowing the rotation is a spool axle 120. A pair of swivel joints 118 may be located within the spool axle 120 with inlets and outlets to allow water into and out through the water lines 72a that lead to the filter 38. The interior of the swivel joints 118 are fluidly connected to water lines 72b that lead to the manifold 64.

As the door 16 is opened and closed, increasing and decreasing the distance between the manifold 64 and the dispenser 30, a torsion spring (not shown) operably connected to the spool 114, allows the spool 114 to rotate as the door 16 is opened and closed and either take up the slack generated, or release more slack out to the manifold depending on the configuration of the dispenser 30 with respect to the manifold 64. This taking up and releasing of the slack is the dynamic management or active management of the slack in the system. A spool tensioner set screw 116 may also be included to increase or decrease the rotational friction of the spool and the dispenser to allow more or less freedom of rotation of the spool 114.

FIGS. 37-38 shows the dynamic slack control in a partially assembled state. They detail side and front views of the spool 114, the lines 72a to and from the filter 38 and the dispenser 26, the lines 72b within the spool that lead out to manifold 64. Also shown in FIG. 38 is a protective flexible conduit 122 that may be attached to the cabinet 12 at a location that is convenient near a corner of the cabinet 12 to prevent the lines 72b from kinking, abrading, or cutting.

Figure 37B:
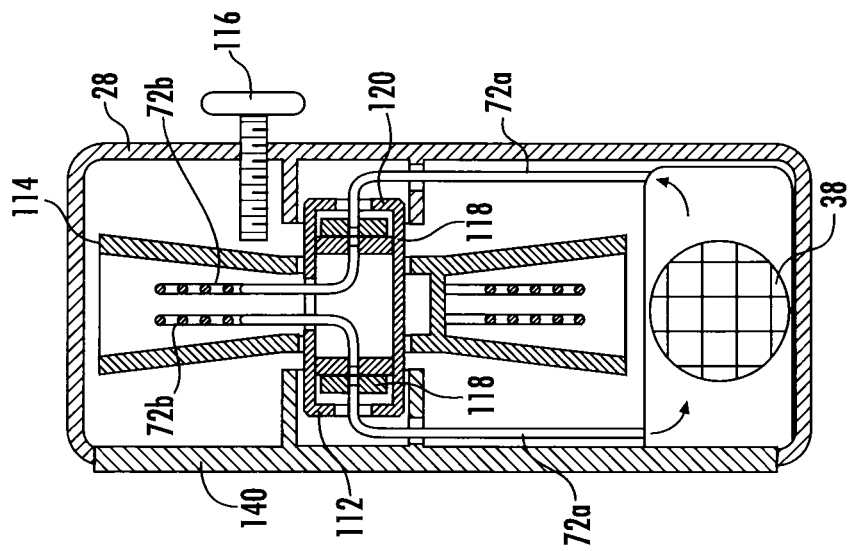
FIG. 37B shows a cross sectional side schematic view of a removable water dispenser incorporating an active slack control within the housing of the removable water dispenser.
Figure 37A:
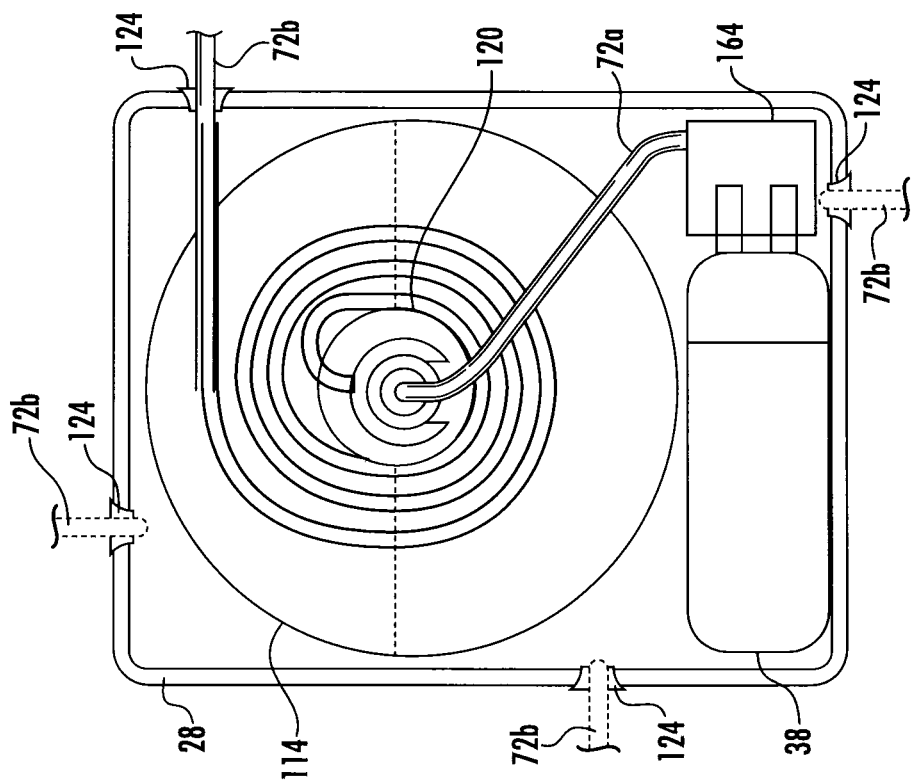
FIG. 37A shows an elevated front schematic view of a removable water dispenser incorporating an active slack control within the housing of the removable water dispenser.

FIGS. 37A and 37B show the dynamic slack control in a fully assembled state. FIG. 37A shows a front view cutaway view of the dispenser 30. Water may enter and leave the dispenser through water lines 72b (detailed in FIGS. 38 A-D) in any of the sides of the dispenser 30. It should be noted that the dispenser 30 may be configured such that the lines 72b may enter at any point along the perimeter of the dispenser 30, but four are detailed in FIG. 37A for clarity. A grommet 124 may be used on the cover 28 to keep the water lines 72b from kinking or cutting. The apertures may initially be manufactured with knock-outs (not-shown) that cover the holes. These knock-outs may be easily removable or replaced by a user without the use of tools to allow the user to feed the water lines 72b into the interior of the dispenser 30. For instance, the cover 28 may be an injection molded thermoplastic, with thin walls at the perimeter of the apertures. Thin walls in this context means thin enough that a user may push the portion of the aperture inside the relatively thin-walled perimeter in order to push the plastic out of the housing without having to drill or otherwise use another tool to open the aperture.

Water entering the dispenser 30 travels through one swivel joint 118, into one water line 72a, through the filter 38, back into the other water line 72a, either out to dispenser nozzle 26, or back through the other swivel joint 118, water line 72b and out to manifold 64. A dispenser manifold 164 may also be included within the dispenser 30 to allow for the two different destinations (nozzle 26 and manifold 64) of the water after it has been filtered.

Figure 38A:
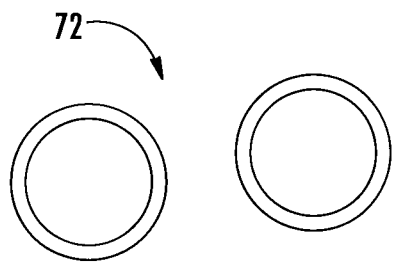
FIGS. 38A-38D show alternative embodiments of how water may enter and leave the dispenser through water lines. These figures show alternative configurations for the water lines that may be used in connection with the removable water dispenser systems of the present disclosure.
Figure 38B:
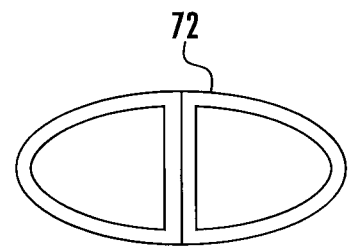
Figure 38C:
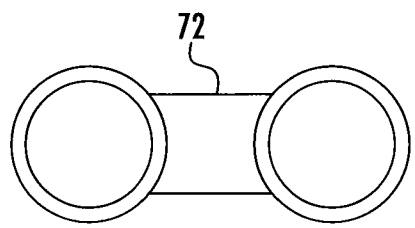
Figure 38D:
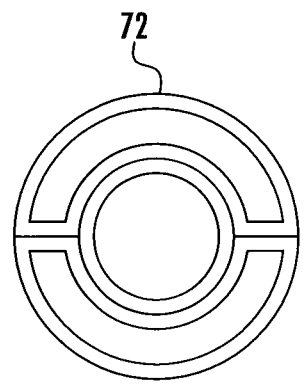

FIGS. 38A through 38D show a number of combinations/configurations for the water line 72. As the water lines from the manifold to the dispenser 30 may need to carry water both to and from the filter 38 simultaneously and/or independently, two separate lines, as shown in FIG. 38A, may make up the water line 72. As shown in FIG. 38B, the water line 72 may be a single line separated at a mid-point of the circumference into a water line leading to the filter and one leading from the filter. FIG. 38C shows another configuration of the water line 72 which has a single water line with two individual water lines separated by a connecting midpoint. FIG. 38D shows still another embodiment of the water line 72 in which the lines leading to and from the filter 58 are coaxial, one nested within the other.

Figure 39:
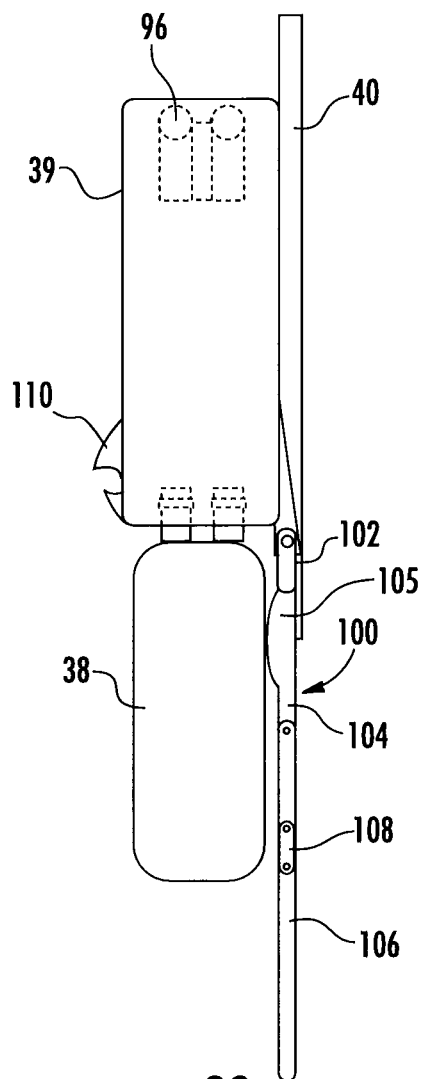
FIG. 39 is an elevated side schematic view of a water filter being installed into the removable water dispenser according to an aspect of the present disclosure.

FIGS. 39 through 42 show an apparatus and method of locking a filter in place within the removable water dispenser 30. As shown in FIG. 39, the backplate 40 of the water dispenser 30 is shown with a number of linkages attached to it. The filter locking assembly 100 may include a first linkage 102 attached to the backplate 40. An intermediate linkage 104 may be hingedly attached to the first linkage 102. The intermediate linkage may include a raised portion 105. A locking lever 106 may be hingedly attached to the intermediate linkage 104. The locking lever 106 may further include a locking member or linkage 108 rotationally attached in an intermediate portion of the locking lever 106. The filter 38 may be slidably disposed within a filter housing 39. The filter housing 39 may include a latch 110 that corresponds to the locking member 108.

Figure 40:
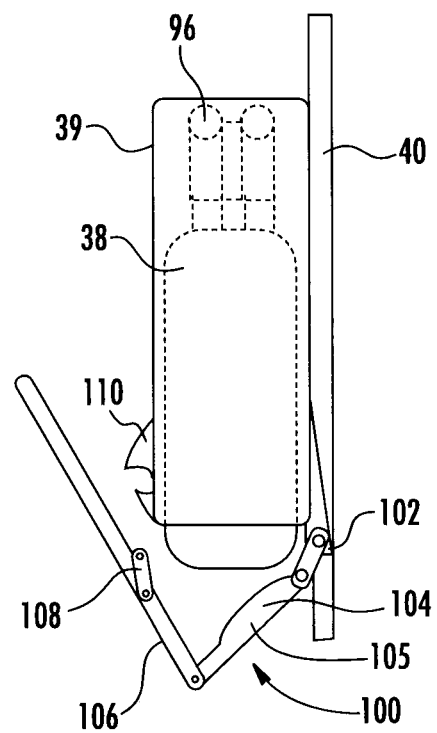
FIG. 40 shows the water filter in the partially engaged position.
Figure 41:
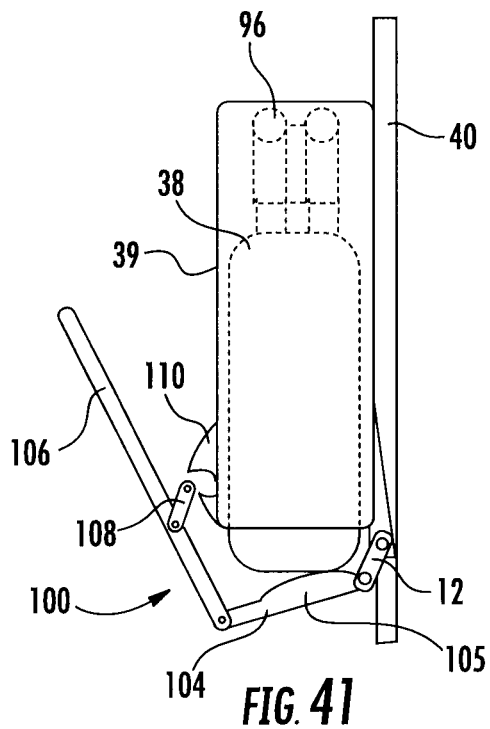
FIG. 41 shows the water filter engagement system and locking linkage in a closer to water filter engaged position.
Figure 42:
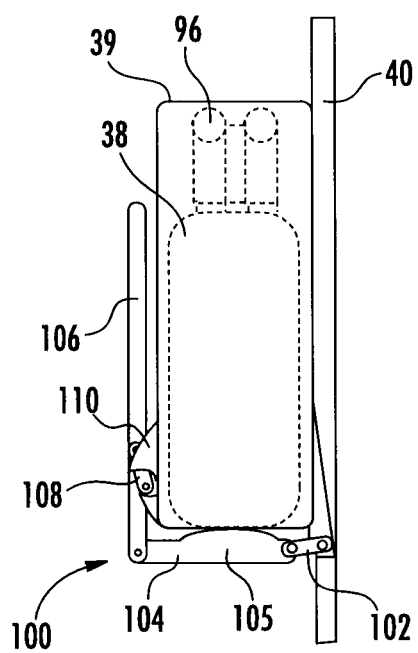
FIG. 42 shows a schematic view of the system in the water filter engaged position.
Figure 43:
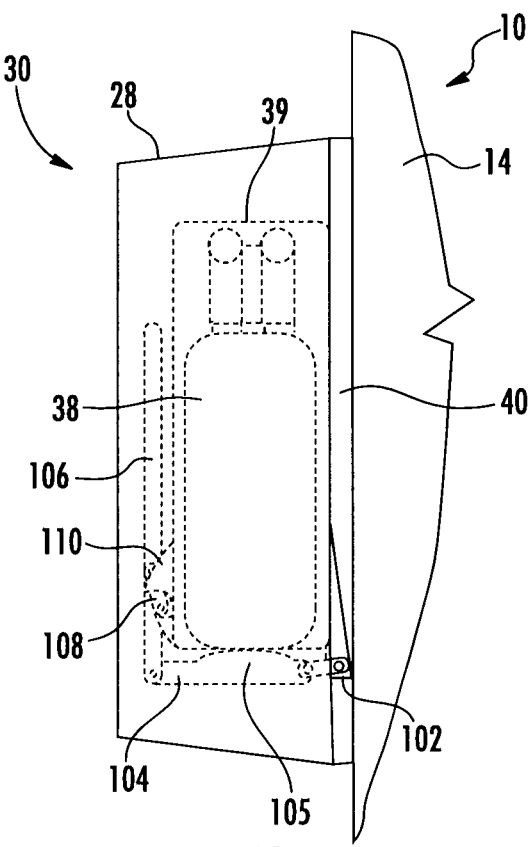
FIG. 43 shows a schematic view of the locking linkage and the filter in the engaged position within the removable water dispenser according to an aspect of the present disclosure.

A user may insert a filter 38 into the housing 39 and a filter receiver 96. The locking assembly may be laying flat against the refrigerator 10, door 16, or cabinet 12 in its fully open position during the filter insertion (See FIG. 39). The filter receiver 96 may provide enough frictional resistance to keep the filter in place in an intermediate position until the locking assembly 100 can be rotated and lock the filter into its home position. A user may then grab the locking lever 106 and begin rotating it upward, as shown in FIG. 40. As the locking assembly moves toward its locked position, the intermediate linkage 104 contacts an end of the filter 38 at the protrusion 105 (FIG. 41). The locking linkage 108 may be inserted into the latch 100 at this point. The locking lever is then rotated into its fully locked position as shown in FIG. 42, with the latch rotating the locking member 108 into a substantially vertical position opposing the force of gravity, and holding the locking assembly 100 in place. The intermediate linkage 104 with the protrusion 105 pushes the filter 38 to a fully seated position within the filter receiver 96, holding and locking the filter 38 in place. The entire assembly 100 is stowed in a convenient location, as shown in FIG. 43, the fascia or cover 28 may then be placed over the filter, filter housing, and locking assembly 100 providing an aesthetically pleasing cover for the dispenser 30.

In another embodiment as shown in FIG. 44, a removable water dispenser is shown. The dispenser 30 may have a front fascia 28, backplate 40, filter cover 37, dispensing nozzle 26, a dispensing paddle 36, and a dispensing area 34 as described before. The dispenser 30 may also have a main body housing 128 located between the backplate 40 and the front fascia 28. The dispensing paddle 36 may be located above the nozzle 26 or below within the dispensing area. The dispensing paddle may also be replaced with one or more sensors to sense when a liquid vessel is positioned within the dispensing area or there may be a depressible portion of the facia that activates the dispensing function. A physical paddle is not required. Only some switch or other mechanism to recognize and time the correct time for dispensing. The filter cover 37 in this embodiment may be disposed on the top of the unit 30.

This embodiment is shown in further detail in FIGS. 45 and 46. Adhesive strips or disks 446a and 446b may be adhered to the refrigerator door or cabinet. Then a backplate 40 may be placed over the adhesive strips or magnets, which are preferably cylindrical-shaped disks 446a and 446b in receiving portions 448a and 448b. The magnets could be any shape and are strong enough to retain the water dispenser in engagement with the appliance during normal operation and use, but allow removal of the water dispenser when purposeful removal is desired by the user. The upper magnet, in the two magnet embodiment shown in FIGS. 44-46, has a diameter of about 43 mm and provides from about 8 kg to about 9.5 kg of pull force, more typically about 8.5 kg or exactly 8.5 kg of pull force. The strength of the magnet may vary and be larger or smaller so long as the attachment of the water dispenser allows for retained engagement with the appliance during normal and typical use of the appliance, but also allows for the water dispenser to be removed, typically by hand and without the use of tools or less typically, with the assistance of one or more tools. The lower magnet typically has a diameter of about 66 mm and provides from about 18 kg to about 22 kg, more typically about 20 kg or exactly 20 kg of pull force. The backplate may be secured to the adhesive strips or disks by fasteners 54 as previously described.

The filter housing 39 may then be placed into the backplate 40, and a filter (not shown) inserted into the filter housing 39. The filter may be held in place and secured by a filter lever 437, which may be then covered by an aesthetically pleasing filter cover 37. A water valve 420 may be in line after the water filter and before the dispenser 26. The filter housing may also have an inlet/outlet valve 416 attached near the top of the filter housing 39. The inlet/outlet valve may allow water from the household water supply 60 into the filter and deliver filtered water back out to the refrigerator for use in an icemaker or other filtered water distribution. The valve 416 may be secured to the filter housing via a screw or screws 439.

A main body housing 428 may then connect to the backplate 40 via fasteners between the main body housing 428 and four main body housing bosses 430 located on the backplate 40. It should also be known that any other form of attachment may be used here, such as any previously described attachment methods, snap fits and the like, or any other method known in the art. The main body housing may also have a connection 422 to deliver water from the water valve 420 to the dispenser nozzle 26.

The front fascia 28 may then attach to the main body housing 428. Shown is a plurality of snaps 440 disposed on the fascia 28 that fit into corresponding apertures 442 on the main body housing 428. The snaps 440 fit snugly within the apertures 442 and hold the fascia in place on the main body housing 428. The fascia 28 may also have the dispensing nozzle 26, and a nozzle cover 426 that provides protection for the nozzle 26, and an aesthetically pleasing look to a user. The front fascia may also have a slidable drip tray 410 to collect any water that may drip from the nozzle 26. The tray 410 may have a drip guide 414 and a grill cover 412 that allow water drips to fall through to the tray, but offer a relatively dry surface to a user. The drip tray 410, the drip guide 414 and the grill cover 412 may be slidably attached to the fascia 28 and the main body housing 428 in any known manner in the art, and may slide back behind the fascia 28 such that only a front face 411 of the drip tray 410 is visible when in their fully slid position.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or member(s), connector(s) or other element(s) of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosures. Other substitutions, modifications, changes, and omissions may be made in the design, operating conditions, and arrangement of the desired and other exemplary embodiments without departing from the spirit of the present disclosures.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A removable water dispenser for an appliance, comprising:
  a manifold comprising:
    a first water inlet in liquid communication with a household water supply;
    a first water outlet in liquid communication with the first water inlet;
    a second water inlet; and
    a second water outlet in liquid communication with the second water inlet;
  a dispenser configured to be removably attached to a home appliance comprising:
    a housing;
    a cover coupled with the housing;
    a dispensing outlet; and
    a filter in liquid communication with the first outlet, the second inlet, and the dispensing outlet; and
  wherein the dispenser is configured to dispense filtered water to a user.

2. The removable water dispenser of claim 1, wherein the manifold further comprises an air bleed valve.

3. The removable water dispenser of claim 1, wherein the manifold is attached to a back panel of a home appliance.

4. The removable water dispenser of claim 1, wherein the manifold is attached to a side panel of a home appliance.

5. The removable water dispenser of claim 1, wherein the second water outlet is in liquid communication with an icemaker within a home appliance via a water line.

6. The removable water dispenser of claim 5 further comprising a water valve disposed in the water line between the second water outlet and the icemaker.

7. The removable water dispenser of claim 1 further comprising a plurality of water lines disposed between the household water supply and the first water inlet, between the first water outlet and the filter, between the filter and the second water inlet, and between second water outlet and an icemaker within the home appliance and wherein the home appliance was not originally manufactured with a filtered water dispenser on an external surface of the of the home appliance.

8. The removable water dispenser of claim 7, wherein at least one of the plurality of water lines comprises at least one compression fitting.

9. The removable water dispenser of claim 7, wherein at least one of the plurality of water lines comprises at least one quick disconnect connector.

10. A water dispenser removably attached to a refrigerator, comprising:
  a manifold comprising:
    a first and second water inlet; and
    a first and second water outlet;
  a dispenser configured to removably attach to a face of a home appliance comprising:
    a housing;
    a cover coupled with the housing;
    a dispensing outlet; and
    a filter in liquid communication with the first outlet, the second inlet, and the dispensing outlet; and
  a first water line connected with the first water inlet and a household water supply, a second water line in connection with the first water outlet and the filter, a third water line in connection with the water filter and the second water inlet, and a fourth water line in connection with the second water outlet and an ice maker of a home appliance.

11. The water dispenser of claim 10, wherein the manifold further comprises an air bleed valve.

12. The water dispenser of claim 10, wherein the manifold is attached to a back panel of a home appliance.

13. The water dispenser of claim 10, wherein the manifold is attached to a side panel of a home appliance.

14. The water dispenser of claim 10, wherein the second water outlet is in liquid communication with the icemaker via a water line.

15. The water dispenser of claim 14 further comprising a water valve disposed in the water line between the second water outlet and the icemaker.

16. The water dispenser of claim 10 further comprising a plurality of water lines, disposed between the household water supply and the first water inlet, between the first water outlet and the filter, between the filter and the second water inlet, and between second water outlet and the icemaker.

17. The water dispenser of claim 16, wherein at least one of the plurality of water lines comprises at least one compression fitting.

18. The water dispenser of claim 16, wherein at least one of the plurality of water lines comprises at least one quick disconnect connector.

19. An external water dispenser, comprising:
a retrofittable water dispenser assembly configured to removably attach to a refrigerator comprising:
 a housing comprising a substantially rectangular enclosure bounded on a back side by a backplate, and on a top, bottom, right side and left side by a fascia cover, wherein the backplate further comprises a keyhole slot;
 a water filter; and
 a water dispenser in liquid communication with the water filter, the water dispenser being accessible to a user without opening a door of the refrigerator;
 first and second water lines fluidly connected from a household water source to the filter and comprising an excess length;
 a filter manifold disposed within the housing and configured to direct water from the first water line through the filter and out to the dispenser and through the second water line; and
a removable base attached to a surface of the refrigerator and having a tab configured to fit within the keyhole slot and hold the backplate in place.

20. The external water dispenser of claim 19 further comprising an adhesive strip with a removable tear-off portion to hold the external water dispenser in place.

\* \* \* \* \*